(12) United States Patent
Santana et al.

(10) Patent No.: US 8,860,437 B2
(45) Date of Patent: Oct. 14, 2014

(54) READOUT SYSTEM FOR MEMS-BASED CAPACITIVE ACCELEROMETERS AND STRAIN SENSORS, AND METHOD FOR READING

(75) Inventors: Juan Santana, Nuenen (NL);
Christinus Antonetta Paulus van Liempd, Schijndel (NL); Richard van den Hoven, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 516 days.

(21) Appl. No.: 13/226,153

(22) Filed: Sep. 6, 2011

(65) Prior Publication Data

US 2012/0062244 A1 Mar. 15, 2012

Related U.S. Application Data

(60) Provisional application No. 61/382,423, filed on Sep. 13, 2010.

(30) Foreign Application Priority Data

Sep. 14, 2010 (EP) .................................. 10176693

(51) Int. Cl.
*G01R 27/26* (2006.01)
*G01P 15/125* (2006.01)
*G01D 5/24* (2006.01)
*G01L 9/12* (2006.01)

(52) U.S. Cl.
CPC ............... *G01L 9/12* (2013.01); *G01P 15/125* (2013.01); *G01D 5/24* (2013.01)
USPC .......................................... 324/658

(58) Field of Classification Search
USPC .................... 178/18.06, 19.03; 324/658–690; 341/33; 345/173, 174
See application file for complete search history.

(56) References Cited

U.S. PATENT DOCUMENTS

| | | | |
|---|---|---|---|
| 4,699,379 A * | 10/1987 | Chateau et al. | .................. 473/59 |
| 4,791,352 A | 12/1988 | Frick et al. | |
| 5,083,091 A | 1/1992 | Frick et al. | |

(Continued)

OTHER PUBLICATIONS

Extended European Search Report for European Patent Application No. 10176693.9-2213 dated Feb. 11, 2011.
Wung et al., "Tri-Axial High-G CMOS-MEMS Capacitive Accelerometer Array", IEEE 21$^{st}$ International Conference on Micro Electro Mechanical Systems, 2008, pp. 876-879.

(Continued)

*Primary Examiner* — Melissa Koval
*Assistant Examiner* — Daniel Miller
(74) *Attorney, Agent, or Firm* — Knobbe Martens Olson & Bear LLP

(57) ABSTRACT

A method and an electronic readout circuit for measuring a capacitance of a MEMS sensor are disclosed. In one aspect, the readout circuit includes: an input stage for receiving a first signal from the sensor and for presenting a second signal; a charge amplifier stage for amplifying and integrating the second signal; and a control logic for controlling the readout circuit according to a predefined timing relation synchronized to actuation voltages applied to the sensor for generating the first signal. The readout circuit may further includes a first switching unit for applying a first reference voltage to the sensor and a second switching unit for applying the second signal to the charge amplifier stage, wherein the first and the second switching units are controlled according to the predefined timing relation such that a plurality of the second signals are accumulated.

19 Claims, 17 Drawing Sheets

(56) References Cited

U.S. PATENT DOCUMENTS

| | | | |
|---|---|---|---|
| 5,751,154 A | 5/1998 | Tsugai | |
| 5,852,242 A * | 12/1998 | Devolk et al. | 73/514.17 |
| 6,167,748 B1 | 1/2001 | Britton, Jr. et al. | |
| 6,509,746 B1 | 1/2003 | Wang | |
| 6,713,828 B1 | 3/2004 | Chavan et al. | |
| 2004/0207034 A1* | 10/2004 | Sakai | 257/420 |
| 2006/0273805 A1* | 12/2006 | Peng et al. | 324/686 |
| 2007/0029629 A1 | 2/2007 | Yazdi | |
| 2008/0122453 A1 | 5/2008 | Hunter | |
| 2008/0122457 A1 | 5/2008 | Taguchi | |
| 2008/0191800 A1 | 8/2008 | Fang et al. | |
| 2008/0297243 A1 | 12/2008 | Chen | |
| 2009/0322353 A1 | 12/2009 | Ungaretti et al. | |

OTHER PUBLICATIONS

Yazdi et al., "Precision Readout Circuits for Capacitive Microaccelerometers", Proceedings of IEEE Sensors, 2004, vol. 1, pp. 28-31.

Steadman et al., "A CMOS Photodiode Array With In-Pixel Data Acquisition System for Computed Tomography", IEEE Journal of Solid-State Circuits, vol. 39, No. 7, Jul. 2004, pp. 1034-1043.

Weng et al., "A High-Speed Low-Noise CMOS 16-Channel Charge-Sensitive Preamplifier ASIC for APD-Based PET Detectors", IEEE Transactions on Nuclear Science, vol. 50, No. 4, Aug. 2003, pp. 898-902.

Suster et al., "A High-Performance MEMS Capacitive Strain Sensing System", Journal of Microelectromechanical Systems, vol. 15, No. 5, Oct. 2006, pp. 1069-1077.

ADXL330 3-Axis ±3g iMEMS Accelerometer DataSheet, Analog Devices, 2007.

* cited by examiner

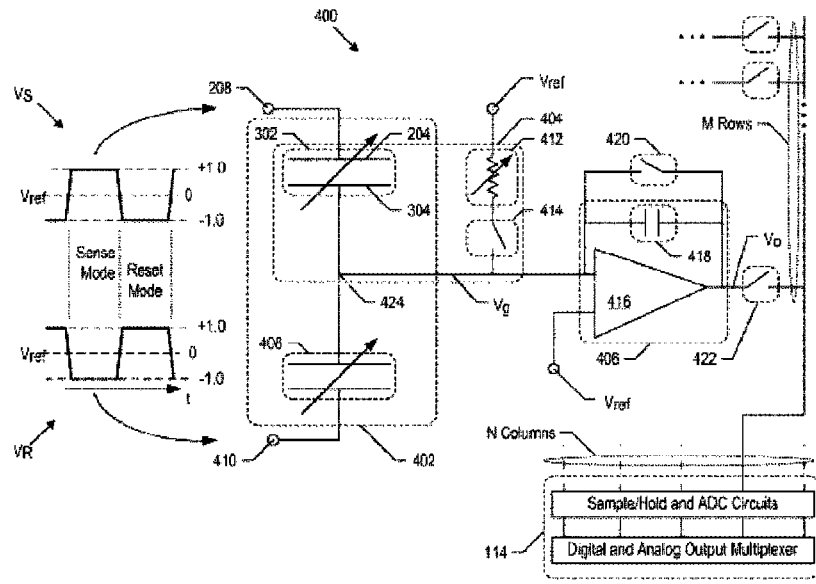
Fig. 1A - PRIOR ART
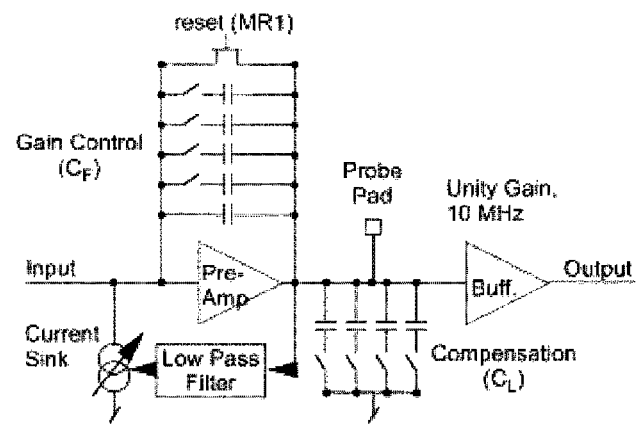
Fig. 1B - PRIOR ART

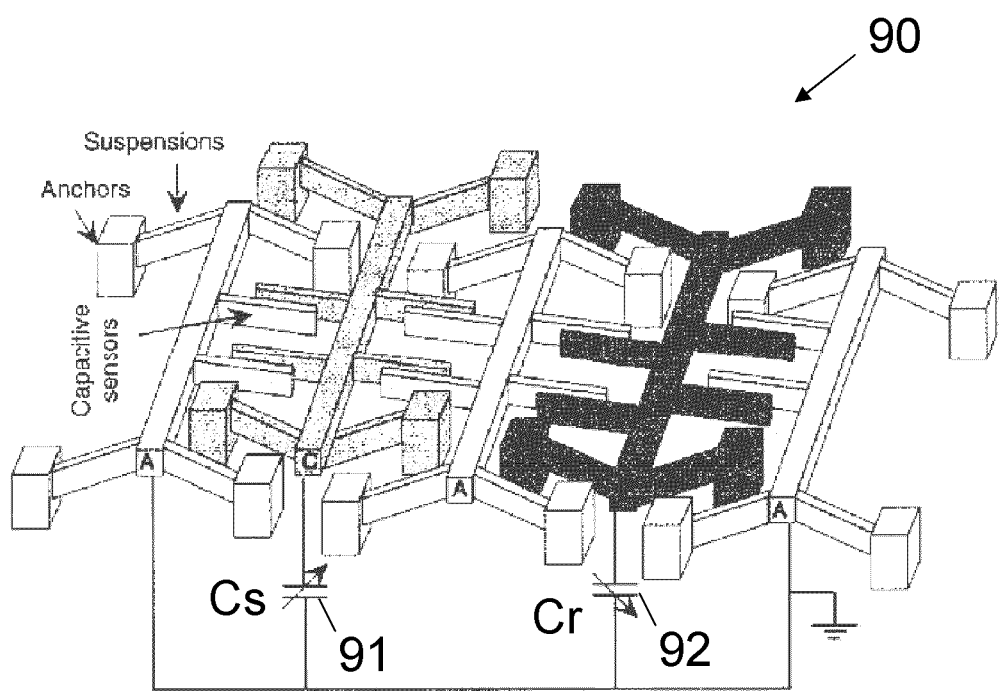
Fig. 1C - PRIOR ART

READOUT SYSTEM FOR MEMS-BASED CAPACITIVE ACCELEROMETERS AND STRAIN SENSORS, AND METHOD FOR READING

CROSS REFERENCE TO RELATED APPLICATIONS

This application claims priority under 35 U.S.C. §119(e) to U.S. provisional patent application No. 61/382,423 filed on Sep. 13, 2010, which application is hereby incorporated by reference in its entirety.

BACKGROUND OF THE INVENTION

1. Field of the Invention

The disclosed technology relates to an electronic readout circuit and a method for measuring a capacitance value of a capacitive microelectromechanical systems (MEMS) sensor, and also to an electronic device comprising such a readout circuit.

2. Description of the Related Technology

Readout circuits for accelerometers and strain sensors, based on capacitive comb finger MEMS devices are in high demand for applications such as automotive, gaming and monitoring the structural integrity of constructions. All known state-of-the-art readout schemes are based on some kind of modulation-demodulation principle, and make some trade-off between power consumption, resolution, gain, bandwidth, noise and amount of motion artifacts. This is a field of intensive research for many years already.

US20080122453 describes a radiation sensor array using two actuator voltages to measure a sensing capacitor. A disadvantage of this architecture is that it does not allow a flexible trade-off between gain, bandwidth and noise.

SUMMARY OF CERTAIN INVENTIVE ASPECTS

Certain inventive aspects relate to an electronic readout circuit for measuring a capacitance value of a MEMS sensor offering a more flexible trade-off for gain, bandwidth and noise.

One inventive aspect relates to an electronic readout circuit for measuring a capacitance value of a MEMS sensor and for generating an output signal indicative of the measured capacitance value. The circuit includes a) an input stage having an input port for receiving a first signal from the MEMS sensor, the first signal being indicative of the capacitance value, and an output port for presenting a second signal derived from the first signal, b) a charge amplifier stage connected to the output port of the input stage for receiving the second signal, and having components for amplifying and integrating the second signal, and an output for presenting the amplified and integrated second signal as the output signal, c) control logic for controlling the operation of the readout circuit according to a predefined timing relation synchronized to a first and a second actuation voltage which are applied to the MEMS sensor for generating the first signal on an output of the MEMS sensor, d) a first switching unit connected between the input port of the input stage and a first reference voltage source for applying a first reference voltage to the MEMS sensor, e) a second switching unit connected between the input port and the output port of the input stage for applying the second signal to a first input of the charge amplifier stage, wherein the first and the second switching unit are connected to the control logic for being controlled according to the predefined timing relation such that a plurality of the second signals are accumulated on the charge amplifier stage.

In this document "capacitance value" means a capacitance difference between two capacitances of a half bridge structure, or the capacitance of a single capacitor.

In this document the terms "MEMS device" and "MEMS sensor" or "sensor" are used as synonyms.

The inventor came to the idea of not integrating a single second signal in the charge amplifier stage, but integrating a number of such signals, e.g. two or four or an adjustable number, thereby providing for a time-controlled variable gain.

Up till now gain control was always done by using a programmable gain controller (PGA) or by changing the integrator capacitor, which may be done in practice by using switched capacitors. With the circuit, an additional gain control is possible by a suitable timing control, more specifically by adapting the number of second signals to be integrated. Using this principle, the amplitude of the actuator signals can be decreased, or alternatively the sensitivity and the dynamic range of the readout circuit can be increased. It also allows minimizing the noise by accumulating multiple measurements instead of relying on a single measurement, because the amplitude of the output signal typically increases with the number "N", while the noise increases only with the square-root of "N".

Thanks to this flexible gain control, the readout circuit according to one inventive aspect is capable and well suited for reading a wider range of sensor devices, such as accelerometers ranging from about 2 g to 10 g max acceleration, and e.g. strain sensors in the range of about 10000 to 30000 micro-strains, or (in both cases) even outside this range depending on the device or application bandwidth.

Despite of the intensive research in the field of MEMS devices and MEMS readout circuits, as far as the inventor knows, no other readout circuit has used this principle before. On the contrary, the readout circuits are usually matched to a specific range of MEMS devices, making them rather unsuited for MEMS devices with other characteristics (e.g. resonance frequency, maximum actuation voltage, etc).

By providing the first and second switching units and suitable timing, the intermediate value already stored in the charge amplifier stage can be left undisturbed when the actuation voltages return to their original state, thereafter a next second signal can be accumulated (i.e. integrated) to the value already stored in the charge amplifier.

In one inventive aspect, the first reference voltage source is also connected to a second input of the charge amplifier stage.

In one inventive aspect, the readout circuit further comprises a) an input capacitor connected between the MEMS sensor and the second switching unit for capacitively coupling the output of the MEMS sensor to the first input of the charge amplifier stage while creating a DC-offset between the sensor and the charge amplifier stage, and b) a second reference voltage source connected to a second input of the charge amplifier stage, and third switching unit connected between the input capacitor and the second reference voltage source for pre-charging the input capacitor for creating the DC-offset.

By providing the input capacitor and the second switching unit for charging it, a DC-offset can be created between the sensor and the charge amplifier stage, whereas in the prior art the sensor is typically directly connected to the bias voltage of the amplifier typically present in the charge amplifier stage, whereby the bias voltage is typically set to half the supply voltage to avoid clipping of its output to the voltage rails (power and ground). This means that with the present circuit the DC-voltage supplied to the sensor can be chosen independent from the supply voltage, making the circuit suitable for a much wider range of capacitive sensors, because many sensor devices only allow for a relatively small DC-voltage (e.g. max about 1.0 volt) in order to prevent e.g. pull-in or mechanical sticking of the fingers to the wall, or other failure mechanisms causing the sensor to malfunction.

This DC-offset also allows actuator voltages of the same polarity (e.g., the same sign, such as being both positive) to be used, as will be explained further, thereby simplifying circuit design and cost, and saving overall system power by avoiding the need for negative voltage supplies. This is particularly useful in battery powered applications, such as handheld devices.

The DC-offset also provides for an increased linearity by allowing the voltage required for readout to be chosen independently of the bias voltage of the amplifier, as such voltage applied to the device causes mechanical interaction with the device due to the non-linear relation between the voltage and the electrostatic force on the movable capacitor plates or fingers.

The first reference voltage may be a voltage between ground and the second reference voltage.

The first and the second actuator voltage may have the same polarity. The inventor surprisingly found that it is possible to accurately readout many capacitive sensor devices, even when using actuator voltages of the same polarity, whereas in the prior art typically actuator voltages of opposite signs are used in an attempt to avoid an asymmetric positioning of the sensor. The inventor has further found that when using a small amplitude for the actuator voltages (such as about 0.4 Volt), such asymmetric positioning has a negligible effect. A smaller amplitude of the actuation voltages can be compensated by a larger amplification factor in the charge amplifier stage, which in turn can be achieved by integrating more sense signals, thereby achieving the same or a higher dynamic range, while reducing the noise and residual motion.

The first actuation voltage may comprise a first clock signal, and the second actuation voltage may comprise a second clock signal having the same frequency as the first clock signal, but being about 180° phase shifted. The actuation voltages may e.g. be continuous clock signals. By allowing continuous clock signals to be applied to both the sensor and the readout circuit, complex logic for generating the actuator voltages can be avoided, and synchronization of the control logic and the actuation voltages can be easily achieved. The inventor has moreover found that in case the actuator voltages have the same polarity, the second clock signal can be made simply by means of a Boolean inverter gate. Using such actuator voltages greatly simplifies the circuit design, and the timing verification thereof. However, by using masked clock signals instead of continuous clock signals, so that the actuation voltages are only applied when needed, the power consumption of the readout circuit if further reduced.

The integrator capacitor may comprise a switched capacitor array, for providing additional gain control of the readout circuit. Such a circuit offers an even higher versatile and variable gain setting/dynamic range selection, as the input range can then be selected by varying the number N of pulses to be integrated, or the gain set by the array of capacitors, or a combination of both.

One inventive aspect relates to an electronic device comprising such a readout circuit.

The electronic device may further comprise the MEMS sensor. It is particularly advantageous to integrate the electronic readout circuit and the MEMS sensor on the same substrate, which is possible in CMOS technology.

One inventive aspect relates to a method for measuring the capacitance value of the MEMS sensor and for generating an output signal indicative of the measured capacitance value using such a readout-circuit.

BRIEF DESCRIPTION OF THE DRAWINGS

The disclosure is further elucidated in the appending figures and figure description explaining preferred embodiments of the disclosure. Note that the figures are not drawn to the scale. The figures are intended to describe the principles of the disclosure. Further embodiments of the disclosure can use combinations of the different features and elements of the different drawings, in particular, elements of FIG. 6A may be added to the structures shown in FIGS. 2A and 2B.

FIG. 1A shows a radiation sensor circuit known in the art.

FIG. 1B shows an electronic circuit used in a charge-sensitive preamplifier ASIC for avalanche photodiode detector (APD)-based positron emission tomography (PET) detectors known in the art.

FIG. 1C shows an example structure of a capacitive strain sensor with comb fingers.

FIG. 3A shows the block-diagram of FIG. 2B, with an indication of the switching over time.

FIG. 3B shows a flow-chart indicating the main phases of operation of the circuit of FIG. 3A.

FIGS. 3C-3E show an example of a possible timing-diagram for controlling the circuit of FIG. 3A.

FIG. 4A shows the block-diagram of FIG. 3A, with a more detailed indication of a possible control of the switches.

FIG. 4B shows a table indicating the control of the switches in time relation with the actuation voltages.

FIG. 4C shows part of the flowchart of FIG. 3B in more detail.

DETAILED DESCRIPTION OF CERTAIN ILLUSTRATIVE EMBODIMENTS

Figure 2A:
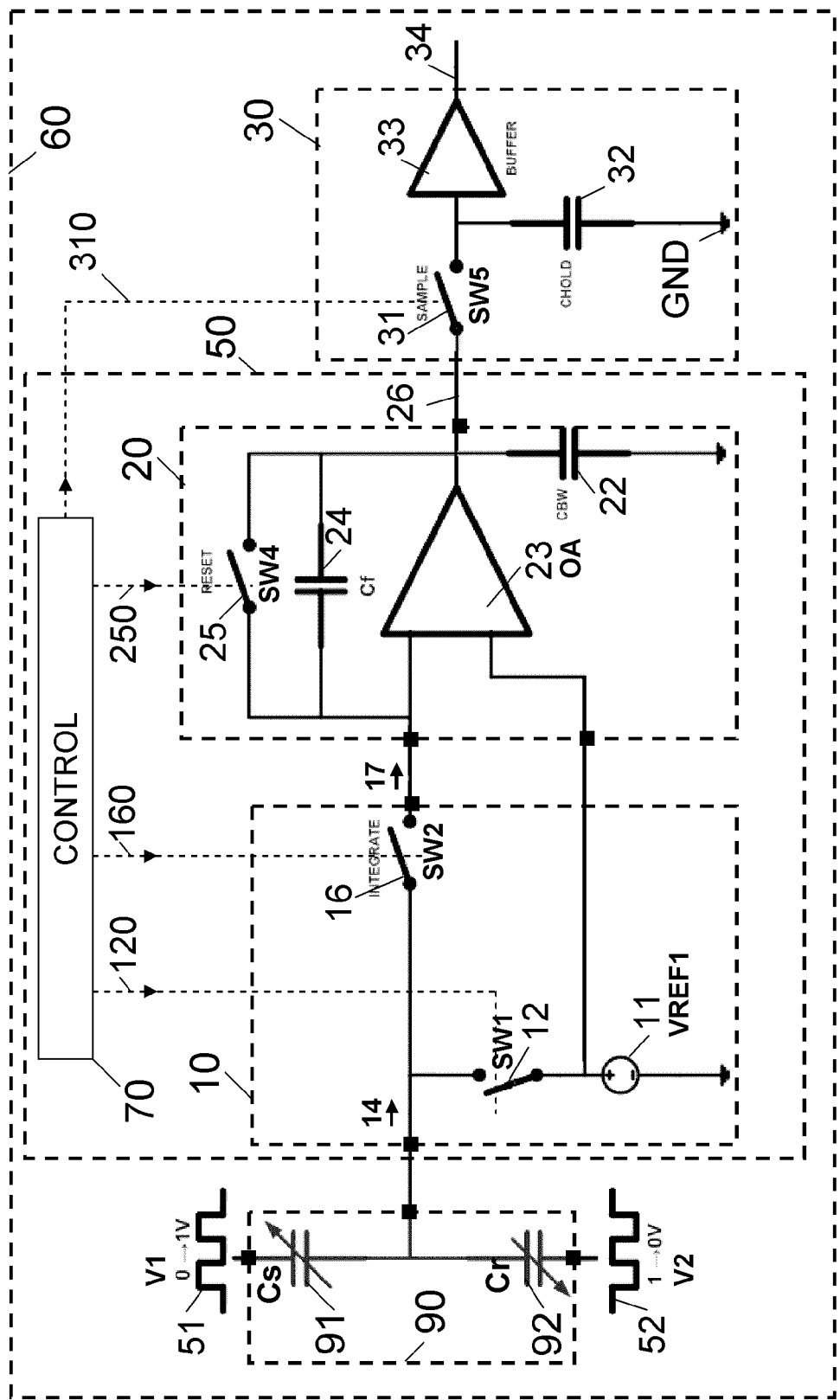
FIG. 2A shows a block-diagram of a first preferred embodiment of an electronic readout circuit according to one embodiment.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure. The drawings are intended to describe the principles of the disclosure. Embodiments of the disclosure can use combinations of the different features and elements with the same reference number of different drawings.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present disclosure, the only relevant components of the device are A and B.

Most off-the-shelf bridge-based readout systems for capacitive MEMS-based accelerometers and strain sensors use the so-called modulation-demodulation scheme [1, 2]. The first stage of such readout system usually consists of a capacitive readout block (Charge Sensitive Amplifier or Programmable Gain Amplifier) which can be used for several types of sensors including photodiodes [3], Charge Coupled Devices (CCD) devices and various capacitive transducers. Several topologies have been reported in literature. The system in [4] describes the operation of the Charge Sensitive Amplifier (CSA) principle when applied to a capacitive transducer (a micro-cantilever transducer for the sensing of chemicals). Programmable Gain amplifiers [5] (PGA) with a bank of feedback capacitors in parallel have been used for Avalanche Photodiodes (APD) detectors to set the gain. Similar embodiments of the previous have been used in Linear Programmable Switch Capacitance Gain Amplifiers [6] consisting of capacitors and switches for sample and hold, so the measurement range can be divided in regions of operation of the switch-capacitor array and thus its linearity improved. The known systems often use chopping techniques [7] to reduce the 1/f noise of the input stage if the application requires low-noise for µg (micro-acceleration) detection. Nevertheless the switches involved produce charge injection problems and very complex compensation schemes have to be applied, plus the digital overhead required for the controlling of the switches and the filters that are involved in the demodulation stage.

When applied to MEMS-based accelerometers and strain sensors with a full/half bridge configuration, the above mentioned topologies are not optimal for Ultra-low-Power applications (with ultra-low-power is meant e.g. consuming less than 100 µWatt) and often impose restrictions for subsequent stages, or extra elements such as external buffers need to be added in commercial devices [8]. The schemes applied suffer from problems arising from the nature of the sensor. Among them is the residual motion effect, which is an effect due to the electric field applied to the capacitive fingers of a comb based MEMS sensor, which creates a spurious signal on the sensor when the sensing frequency is too close to the natural (i.e. mechanical resonance) frequency of the sensor. This spurious signal can seriously affect the resolution of the readout signal since it can amount to several mV once it is amplified. Similar problems appear when using such topologies in strain sensor readout [9].

FIG. 1A shows a block-diagram of a circuit described in US20080122453. It uses positive and negative sense signals, and its timing scheme allows to sense (integrate) only a single sense pulse. It also requires bipolar actuation voltages, and it has a big resistor to limit residual motion.

FIG. 1B shows another prior art circuit as described by Weng et al. in [5], with a pre-amplifier and a feedback-loop. It has two capacitor arrays, one for the integrating capacitor Cf, another for the so called compensation capacitor $C_L$. Both arrays can be configured by means of a register array (e.g. flip flops) which can be serially loaded. This circuit has several disadvantages: the switches of the Cf-capacitor bank (for gain control) may add extra noise, they should be placed after each capacitor (i.e. near the output of the amplifier) not before (i.e. near the input of the amplifier); the low pass filter adds extra components, extra complexity and increases power consumption; and this circuit cannot measure a DC-signal.

FIG. 1C shows an example of a capacitive strain sensor known in the art, so no elaborate explanation is required here. For the sake of this patent application it suffices to mention that the electrical equivalent for this MEMS device 90 is shown in FIG. 2A by block 90, comprising two capacitors 91 (Cs) and 92 (Cr). When stress is exerted upon the sensor 90, the fingers will move, causing one capacitance value (e.g. Cs) to increase while the other capacitance value (e.g. Cr) decreases. By measuring Cs–Cr, the amount of stress can be determined.

Certain embodiments relate to a readout circuit 50 for ultra-low-power applications based on charge integration of modulated pulsed signals 14 from MEMS-devices 90, such as e.g. capacitive accelerometers and capacitive strain sensors, e.g. strain sensors having an interdigitized finger structure, or capacitive pressure sensors. It should be noted however that the circuit also works for capacitive MEMS sensors 90 with plate capacitors instead of finger capacitors.

The purpose of the readout circuit 50 is to detect and amplify the minute capacitance differences resulting from small mechanical displacements in the MEMS device 90. In case of MEMS accelerometers, the measured capacitance is indicative for the mechanical acceleration of the device, while in case of strain sensors, the capacitance is indicative for mechanical strain exerted upon the MEMS device 90.

One embodiment relates to a topology proposed based on a charge amplifier (CA) with a versatile gain and bandwidth control to be applied on the readout of bridge/half-bridge MEMS-based accelerometers and strain sensors. The principles of the readout circuit according to one embodiment will be described for a half-bridge configuration, but can easily be extended to a full-bridge configuration by the person skilled in the art.

Figure 2B:
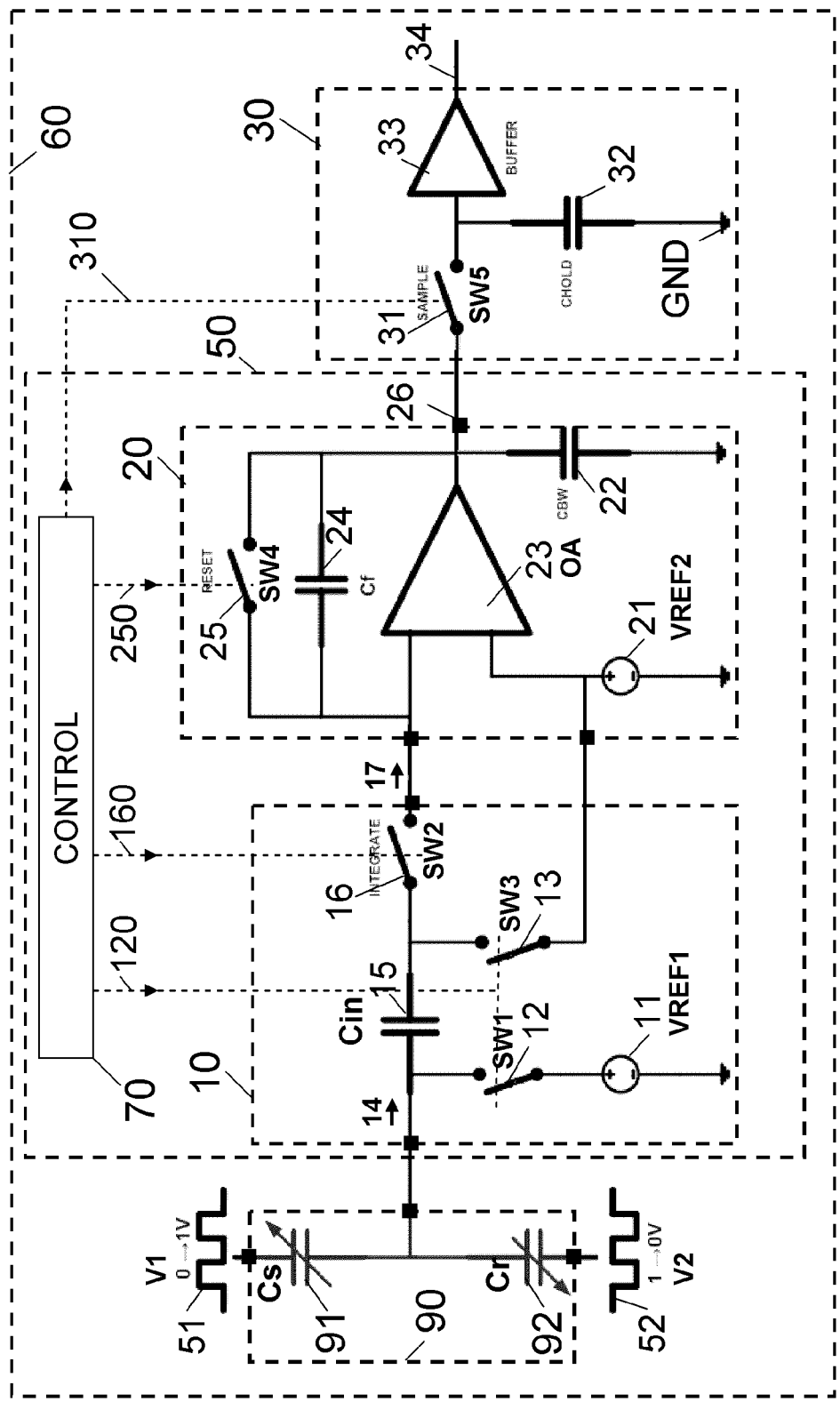
FIG. 2B shows a block-diagram of a second preferred embodiment of an electronic readout circuit according to one embodiment.

FIG. 2A and FIG. 2B show a first and a second embodiment of the readout circuit 50. Both circuits 50 have an input stage 10 and a charge amplifier stage 20, and optionally also a sample and hold stage 30. The difference between the circuits of FIGS. 2A and 2B lies in their input stages 10, which is slightly more complicated for FIG. 2B than in FIG. 2A. The circuit of FIG. 2B will be described in detail, and then the person skilled in the art will also understand the circuit of FIG. 2A.

The circuit diagram in FIG. 2B shows a second preferred embodiment of a one channel architecture, for example to measure acceleration in one direction (e.g. the X-direction) using a single accelerometer MEMS device 90 (also called "MEMS sensor" or "sensor"). As will be described further when discussing FIG. 6A, the readout circuit 50 can be extended to cope with a three-dimensional accelerometer for measuring in three dimensions (e.g. the X, Y, Z directions).

Referring to FIG. 2B, a MEMS-based finger array capacitive accelerometer/strain sensor 90 is represented in the diagram as two variable capacitors 91 (Cs), 92 (Cr). The readout circuit 50 comprises an input stage 10 connected at its input to an output of the sensor 90 for receiving an input signal 14, and at its output to a first input of a charge amplifier stage 20 comprising a charge amplifier 23 for amplifying and integrating a second signal 17 derived from the first signal 14. The input stage 10 comprises an input capacitor 15 and an integrate switch 16 connected in series with each other and located between an output of the sensor 90 and the first input of the charge amplifier stage 20. During operation the stages 10, 20 are controlled by control logic 70 in such a way as to integrate the current (or charge) generated by the actuation voltages 51, 52 (V1, V2) only during part of the time (in the example described further i.e. only during the rising edge of the V1-signal and substantially simultaneous falling edge of the V2-signal), while isolating the reference voltage (Vref1 in FIG. 2A, Vref2 in FIG. 2B) of the amplifier 23 from the sensor 90. Preferably the first and second reference voltages Vref1, Vref2 are constant DC-voltages. The charge amplifier stage 20 of the readout circuit 50 may comprise: a) an amplifier 23 having a first input connected to the first input of the charge amplifier stage 20 for receiving the second signal 17, and a second input connected to the second input of the charge amplifier stage 20 for receiving a reference voltage, and an amplifier output connected to the output of the charge amplifier stage 20 for providing the output signal 26; b) an integrator capacitor 24 connected between the first input of the amplifier 23 and the amplifier output for integrating the second signal 17; c) a reset switch 25 for discharging the integrator capacitor 24; d) a band-limiting capacitor 22 (Cbw) connected between the amplifier output and a reference voltage GND for increasing the stability of the readout circuit 50, in particular to control the bandwidth of the channel at the output of the amplifier (26) and the rise time of the voltage pulse at the output of the amplifier (26). The readout circuit 50 may further comprise a sample-and-hold stage 30 connected to the output of the charge amplifier stage 20 and having components for sampling and holding the output signal 26 and for providing the sampled output signal as the output signal 34. Preferably the readout circuit 50 further comprises an analog-to-digital convertor 63 (ADC, not shown in FIG. 2A or FIG. 2B, but shown in FIG. 6A) for digitizing the output signal 26, 34. Alternatively the output signal 34 can be provided as an analogue output signal. Preferably the first reference voltage Vref1 is different from the second reference voltage Vref2 and different from ground GND, and is preferably a voltage between ground and the second reference voltage Vref2. In the example of FIG. 2B Vref1=1.5V, which is half of the supply voltage VDD of 3.0V, while Vref2=0.5V, which is half the amplitude of the actuation voltages V1 and V2, each having an amplitude of 1.0V in this example. Preferably the first reference voltage Vref1 is a DC voltage with an amplitude of 30-70% of the amplitude of the amplitude of the first actuation voltage 51 (V1), preferably 40-60%, most preferably substantially 50%. In this way an electric field is created in the sensor 90 which keeps the capacitive fingers (or plates) substantially in the middle, thereby reducing the risk of pull-in or mechanical sticking of the fingers to the wall, which might damage the sensor 90.

A typical value of Cin is 176 pF, a typical value of Cf is 90 pF, a typical value of Cbw is 10.8 pF, a typical value of Chold is 1.1 pF. However in other embodiments, these values may be larger or smaller than these numbers, depending on the equivalent $\sqrt{kT/C}$ noise at the capacitor Cin or from the capacitor Cf.

Please note that the aspects related to the serial capacitor 15 (Cin) and the pre-charging means for DC-decoupling of the MEMS sensor 90 from the readout circuit 50 are unrelated to the integration of the plurality of pulses, and may advantageously be used in other read-out circuits as well.

Figure 3A:
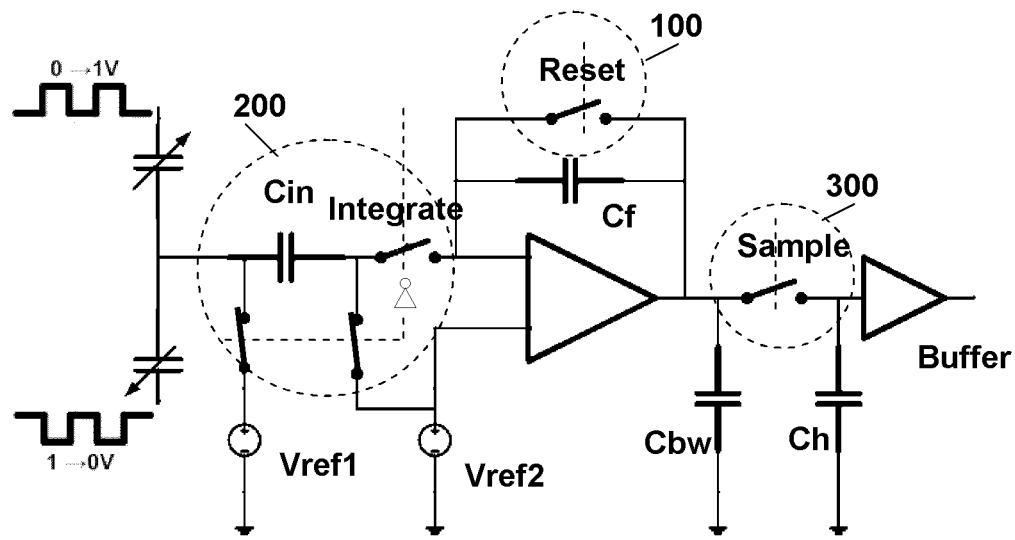
FIGS. 3A-3E show the principle of operation of the electronic readout circuit of FIG. 2B over time.
Figure 3B:
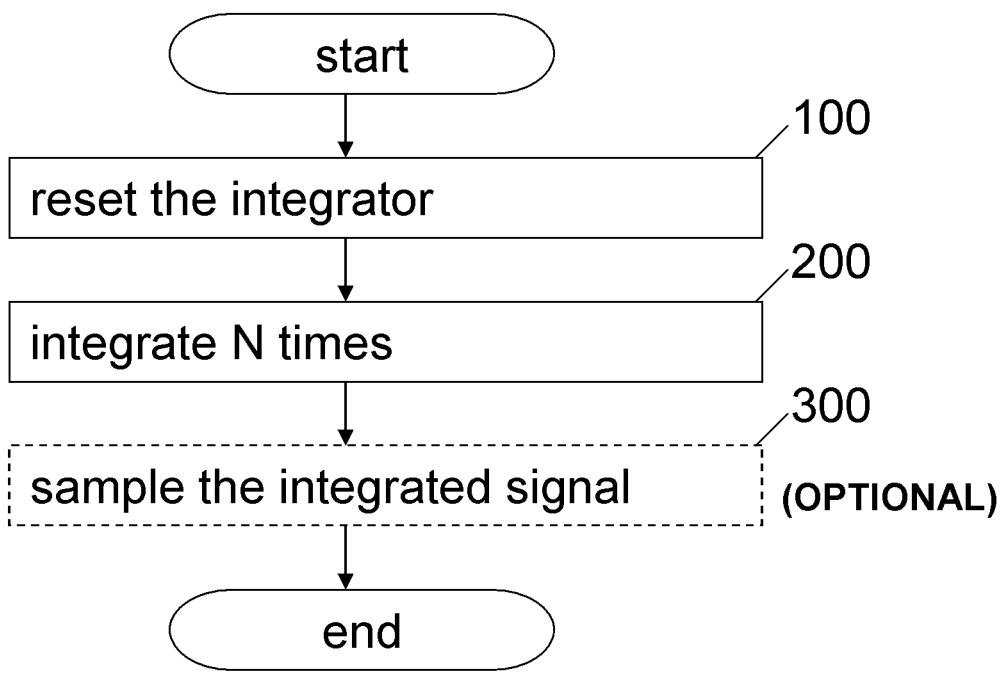
Figure 3C:
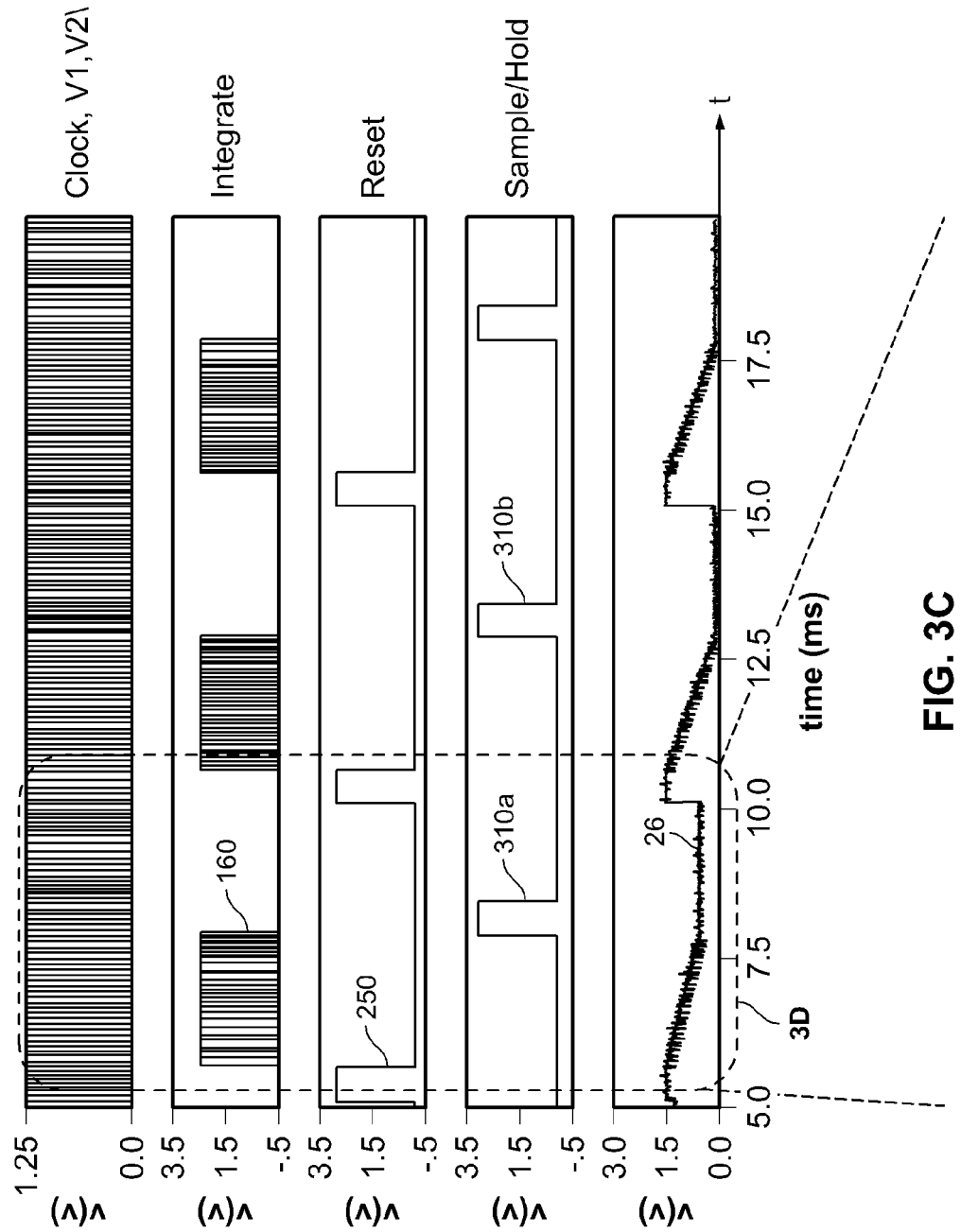
Figure 3D:
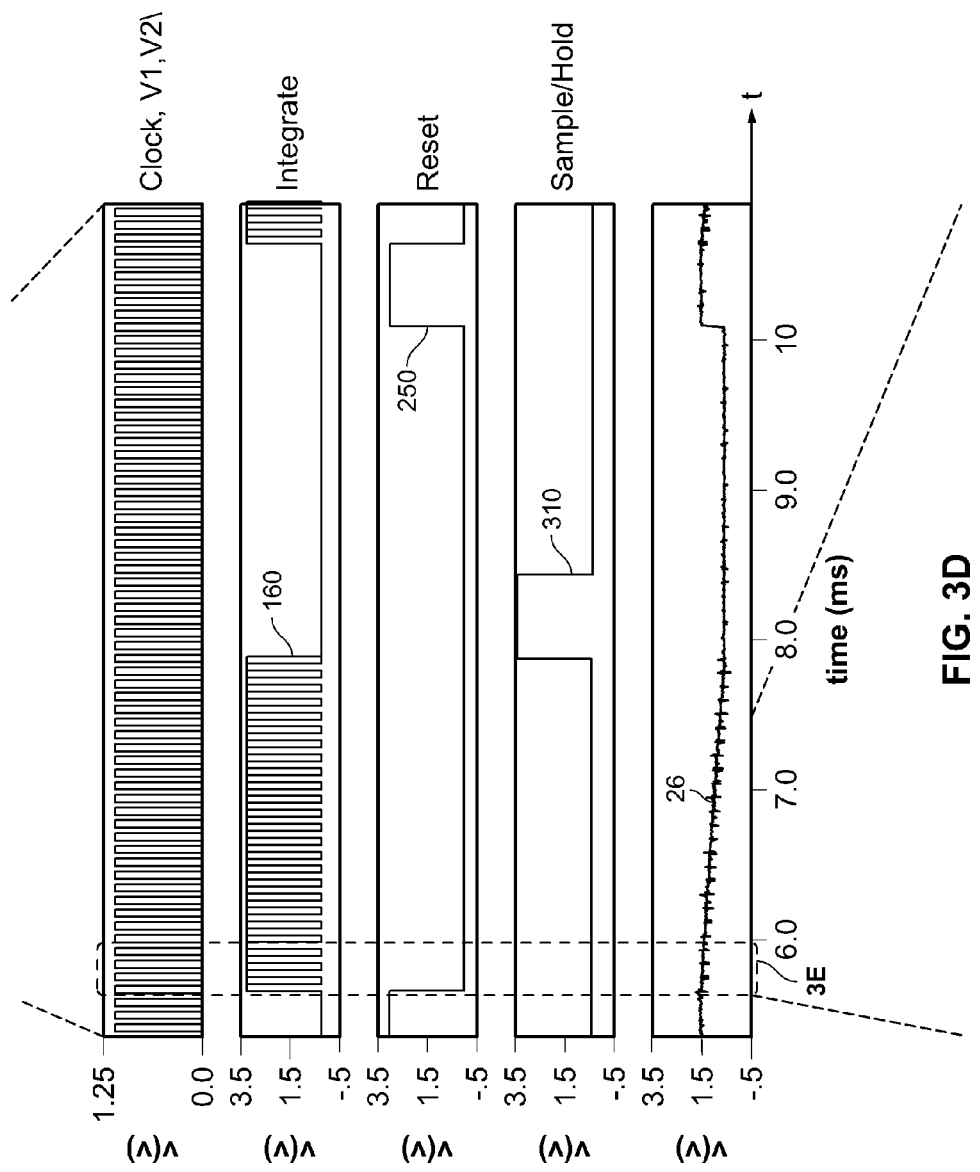
Figure 3E:
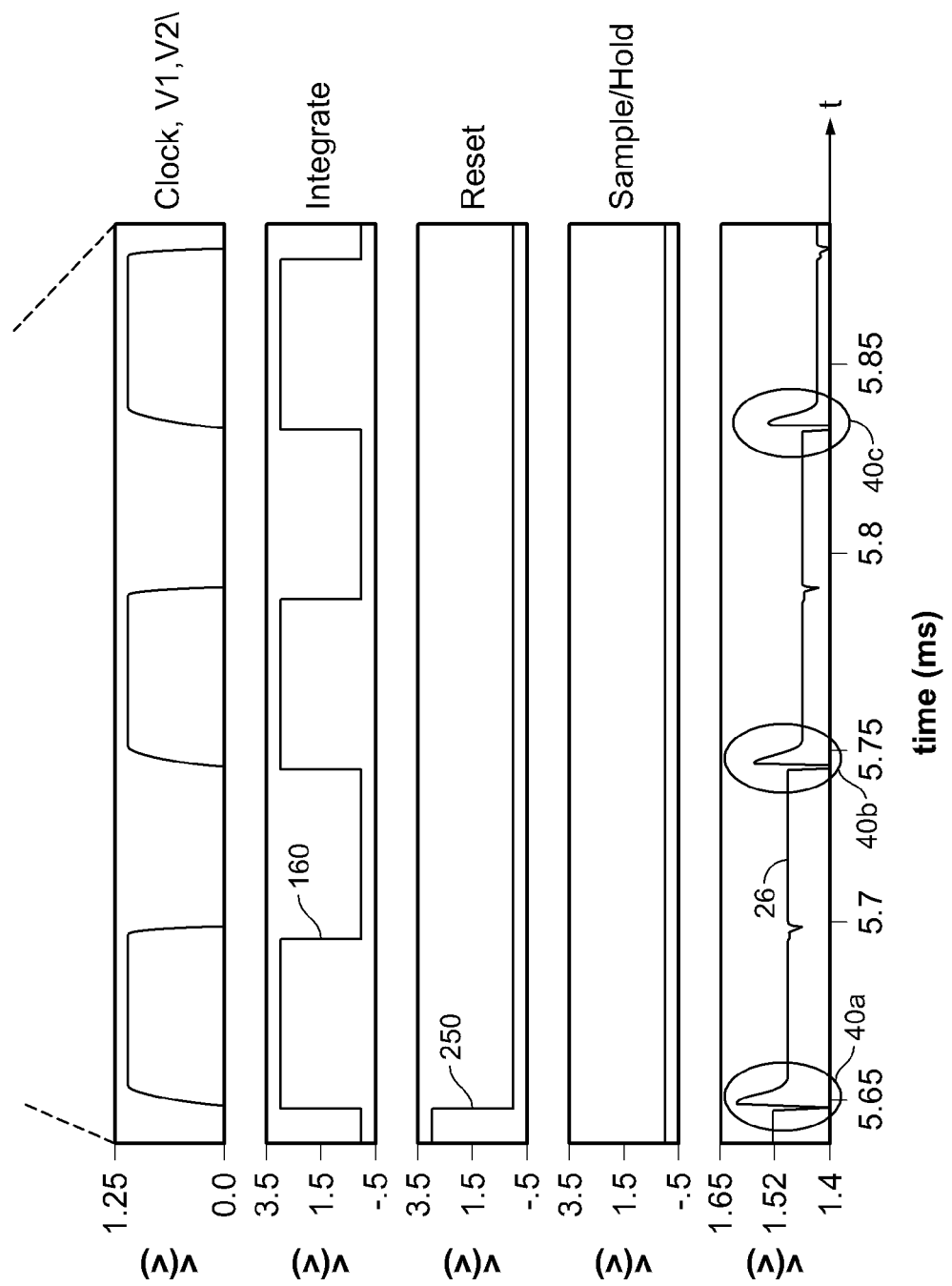

FIG. 3B shows a flow-chart indicating the main phases of operation of the circuit of FIG. 3A over time. The control circuit 70 providing the control signals to the switches is not shown in FIG. 3A, but can be implemented by standard techniques known to the person skilled in the art. The control circuit 70 may e.g. be implemented with digital components (e.g. flip-flops or a shift register) synchronous to the clock, and standard logic gates (such as e.g. nand, nor). FIGS. 3C-3E will show an example of the control signals at high level, while the FIGS. 4A-4C will go into more detail. In a first phase, called the reset phase 100 (RP), the integrator capacitor Cf is discharged by closing the reset switch 25 (SW4), and opening it again. In a second phase, called the integration phase 200 (IP), a charge from the sensor 90, generated by the actuation voltages 51, 52 (V1, V2) is integrated two or more times. This integration phase IP involves many sub-steps IP_1, IP_2 etc, as will be described further in relation to FIGS. 4A-4C, and it involves controlling the reference switches 12, 13 (SW1, SW3) and the integrate switch 16 (SW2). In the optional third phase, called the sampling phase 300 (SP), the output value 26, in the example above that is the output voltage corresponding to the integrated charge stored on the integrator capacitor Cf, is sampled and buffered by controlling the sample and hold switch 31 (SW5), allowing the output value 26 corresponding to the measured capacitance of the sensor 90 to be read out, while the readout circuit 50 itself can already start a new measurement. The sample and hold stage 30 is practical because it relaxes the timing to read the output value 26, but is not absolutely required. The analog output value 26 could for example also be captured or digitized by external circuitry.

FIGS. 3C-3E show examples of timing-diagrams of the control signals for the readout circuit 50 of FIG. 3A. Each of the FIGS. 3C-3E show five graphs representing a clock signal and control signals 160, 250, 310 for opening or closing the switches. Note that the control signals 120 for the reference switches 12, 13 (SW1, SW3) are not shown in a separate graph, because, for the sake of understanding the circuit (without taking timing into account, the two reference switches 12, 13 (SW1, SW3) are both opened (resp. closed) when the integrate switch 16 (SW2) is closed (resp. opened), the latter being shown as the second graph "Integrate". This relation is symbolically indicated in FIG. 3A and FIG. 4A by the inverter-symbol between the control lines 120 and 160. In a practical implementation this may however be implemented differently.

The first plot of FIG. 3C shows a continuous clock signal, which—in the example above—is the synchronous clock signal for the control logic 70 of the readout circuit 50, which plot is also representative for the first actuation voltage 51 (V1) in the case where the actuation voltages are continuous clock signals, whereby the second actuation voltage 52 (V2) would be 180° phase shifted, thus being "1" when V1 is "0" and vice versa. In a practical implementation the actuation voltages V1, V2 may also have a smaller amplitude than the clock signal, for example 1.0V or 0.4V but other amplitudes may also be used. To minimize residual motion, the actuation voltages 51 (V1), 52 (V2) need to be anti-phase signals, which in case of a clock signal may be easily implemented by inverting the clock signal. This relation between the actuation signals 51, 52 is symbolically indicated in the left of FIG. 3A by "0→1V" and "1→0V" respectively, and in FIG. 3C on the right by V1, V2\ (representing "V2 not"). The third plot of each graph shows how during the reset phase RP the reset-signal 250 is high for closing the reset switch 25. The second plot shows the signals for closing and opening the reference switches 12, 13 (SW1, SW3) for pre-charging the input capacitor 15 (Cin), and for opening and closing the integrate switch 16 (SW2) for integrating the second signal 17. The fourth plot shows the sample signal 310 for sampling the output signal 26 by switching the sample and hold switch 31 and for storing it on the hold capacitor 32 (Ch). The sampled value can then be read out until the next sample signal 310b comes for sampling and holding the next output value 26. In the meanwhile the readout circuit 50 can measure the sensor 90 again, as shown in FIG. 3C. The fifth plot shows the transient behavior of the output voltage 26. In this example the output of the amplifier 23 is the accumulated result of twenty-four integration steps. FIGS. 3D and 3E show this in more detail by zooming in on the time-axis. The fifth plot of FIG. 3E shows how each integration 40a, 40b, 40c is in fact a combination of a positive and a negative charge pulse of almost the same amplitude, each pulse being caused by a level-transition of one actuator voltage 51, 52 (V1, V2) which are slightly shifted in time in the example for clearly illustrating the working of the circuit. When the capacitances 91 (Cs), 92 (Cr) of the MEMS device 90 are not exactly equal (e.g. because of an acceleration), in each integration step a small net residual charge 17 indicative of the difference of the capacitances is accumulated on the integrator capacitor 24 (Cf). By keeping the resistances of the connections in the readout circuit 50 sufficiently low (i.e. that their RC-time constant is much smaller than half of the clock period), the circuit has a high bandwidth, allowing the integration of multiple pulses 40a, 40b, 40c, etc, in total twenty-four pulses in the example of FIG. 3D to be accumulated in a relatively short time period.

In the example of the FIGS. 3C-3E the clock frequency is 10.8 kHz, and one output sample 26 is measured and presented approximately every 5 milliseconds, corresponding to an output rate of 20 Hz. However, the disclosure is not limited thereto, and other clock frequencies or timing schemes may also be used. In this respect, it should for example be mentioned that the timing of these plots is not optimized for speed, as in a practical implementation for example the reset signal 250 could be much shorter (e.g. only 2 or 3 clock cycles long). These plots only serve to explain the principles of operation, and in practical implementations other timing schemes may be used.

Figures 4A, 4B:
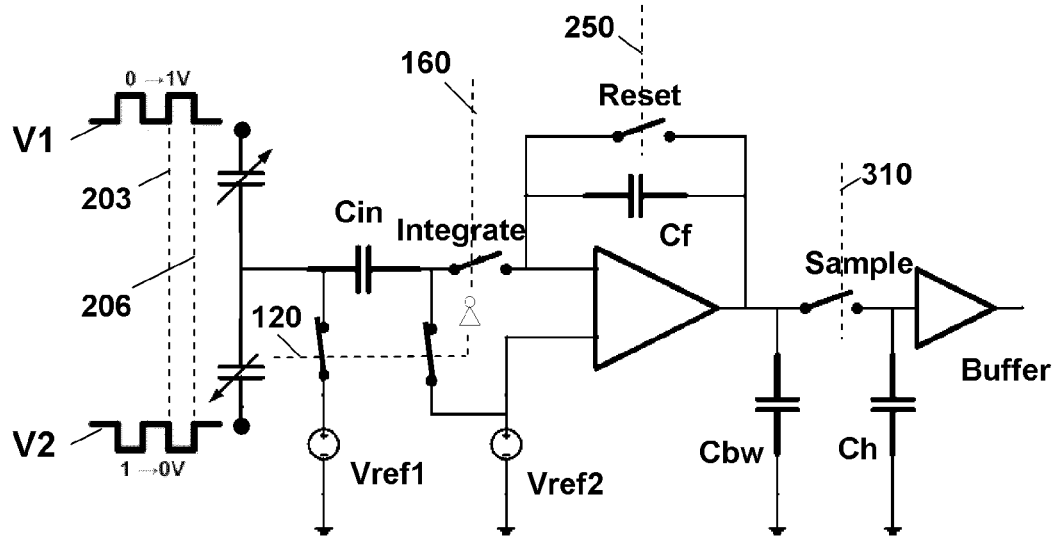
FIGS. 4A-4C show the example of FIGS. 3A-3B in more detail.
Figure 4C:
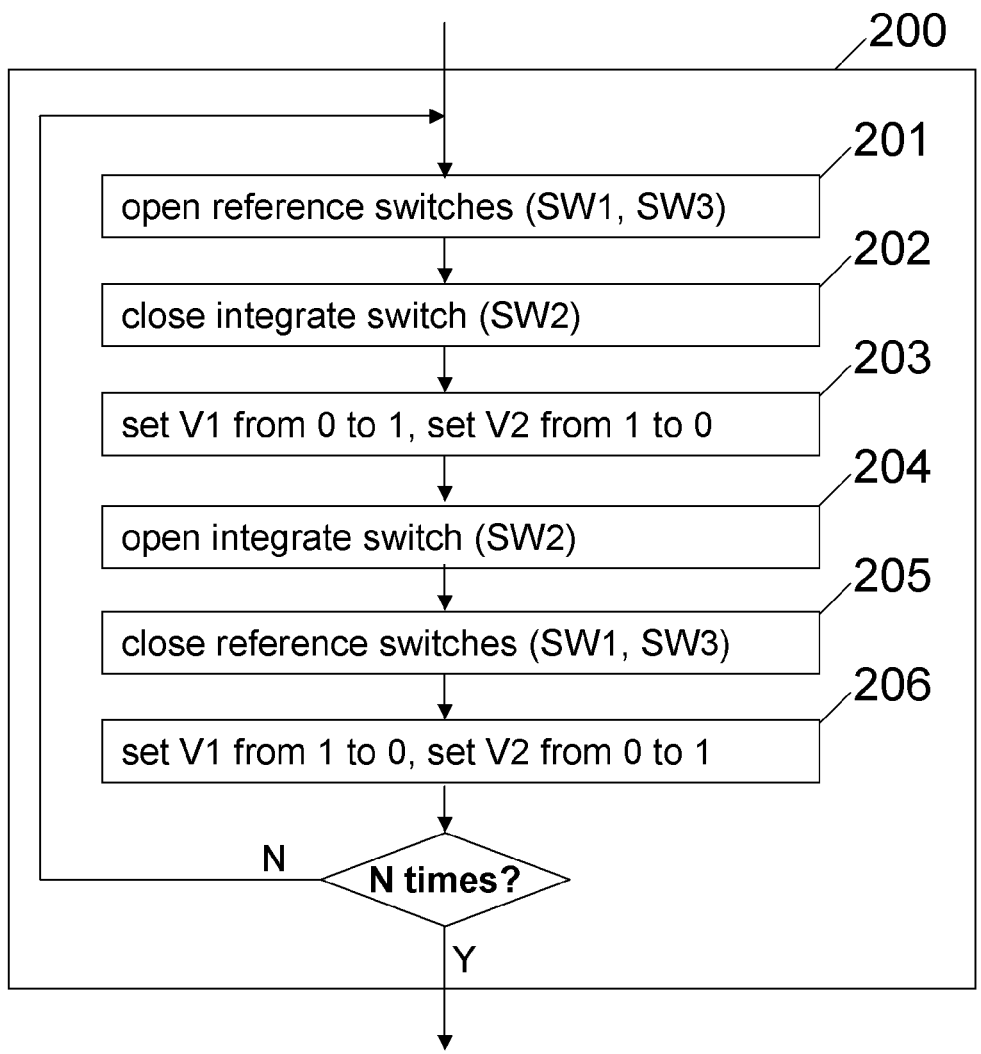

Referring to FIGS. 4A-4C the integration phase 200, IP will now be explained in more detail. FIG. 4A shows again the block-diagram of FIG. 3A, with a more detailed indication of the timing control. FIG. 4B shows an example of a table indicating the state of the five switches of FIG. 4A over time. The circuit starts from the situation as depicted in FIG. 4A where the two reference switches 12 (SW1) and 13 (SW3) are closed, and the other switches SW2 (integrate), SW4 (reset), SW5 (sample & hold) are open. Note that in this state the first actuation voltage 51 (V1) is 0V, and the second actuation voltage 52 (V2) is 1V. In the reset phase 100, RP, the integrator capacitor 24 is discharged using the reset switch 25. This is shown in steps 101 and 102 where the reset switch SW4 is closed and opened again. This is indicated by label 100 in FIG. 3A. The reset phase is followed by the integration phase 200 (IP), consisting of a predefined number N of integration steps IP_1 to IP_N, the number N being at least two. As the actions in all of these individual steps are the same, it suffices to explain one such integration step. In steps 201 and 202 the reference switches 12, 13 (SW1, SW3) are opened and the integration switch 16 (SW2) is closed. The circuit is now ready to receive an input signal 14 (i.e. a charge) from the MEMS sensor 90. In step 203 the actuator voltages 51, 52 (V1, V2) toggle state, substantially simultaneously, thereby generating a current pulse (an example waveform of this pulse was shown in FIG. 3E), represented by the first signal 14, which is a high frequency pulse, passing through the input capacitor 15 (Cin) thereby generating a second current pulse 17, which will cause a net charge to be stored on the integrator capacitor 24 (Cf), thanks to the charge amplifier 23 acting as a charge integrator. In steps 204 and 205 the integrate switch 25 (SW2) is opened again, and the references voltages 11, 21 (vref1, vref2) are applied to the input capacitor 15 (Cin), to remove any residual charge which might have been left on the input capacitor 15. In step 206 the actuator voltages 51, 52 (V1, V2) are toggled back to their original state, thereby causing again a current pulse 14, but this time the current pulse 14 is drawn from the reference voltages 11, 21 (vref1, vref2) without affecting the accumulated charge on the integrator capacitor 24 (Cf), because the integrate switch 16 (SW2) is open. Thus looking back now to the net effect of the steps 201-206, the net charge caused by the first transitions of the actuator voltages (in step 203) is passed to the charge amplifier stage 20, while the net charge of the second transitions of the actuator voltages (in step 206) are bypassed. After step 206 the readout-circuit 50 is the same state as it was after the reset phase (RP), and is ready to start a new measurement cycle, except that now one net charge is stored on the integrator capacitor 24 (Cf).

In the prior art circuits, the integrated value would then be sampled or read out, and the reset switch 24 would then be closed again to discharge the integrator capacitor, and opened again to start a new measurement.

By repeating the steps 201 to 206 N times, the charge corresponding to the capacitance of the MEMS sensor 90 is accumulated on the integrator capacitor Cf N times, (whereby N>1) resulting in a total charge which is larger in amplitude. As the total accumulated charge is proportional to N, but the noise is only proportional to the square-root of N, the signalto-noise ratio SNR of the total charge is improved by the square-root of N. The larger the value of N, the larger the accumulated charge and the larger the signal-to-noise ratio, but the longer the measurement takes, thus the lower the output rate. By choosing a certain number of N, the readout-circuit 50 in one embodiment thus allows a very flexible trade-off between gain, noise and bandwidth. To complete the description of FIG. 4B, after the N integration steps, the accumulated charge is sampled and stored on the hold capacitor 32 (Ch) by closing and opening the sample switch 31 (SW5) in steps 301 and 302.

In one embodiment, the readout circuit 50 is thus capable of integrating a fixed or variable number N of charge/current pulses. This number may be selectable by the user, or may be hard-coded in the circuit (or chip), or may be configured during initialization of the circuit, and may e.g. be chosen depending on the specific sensor being used. The number N may even be modified dynamically during operation of the circuit depending on the circumstances, e.g. when using an accelerometer sensor, N may be set to a large value (e.g. 50) under low acceleration, and may be set to a small value (e.g. 3) under large acceleration. In this way an automatic gain control (AGC) with an optimized signal-to-noise ratio may be implemented, with a minor risk of overflow.

In other words, the system gain is proportional to the number N of pulses 40. The choice of the number N extends the dynamic range that can be covered by the readout circuit 50. This flexible scheme allows several ranges to be set by modifying the timing scheme for controlling the switches SW1-SW5 with the advantage that the Signal to Noise ratio SNR can be optimized for any given sensor, input signal 14 amplitude and signal bandwidth (i.e. the output rate).

Figure 2C:
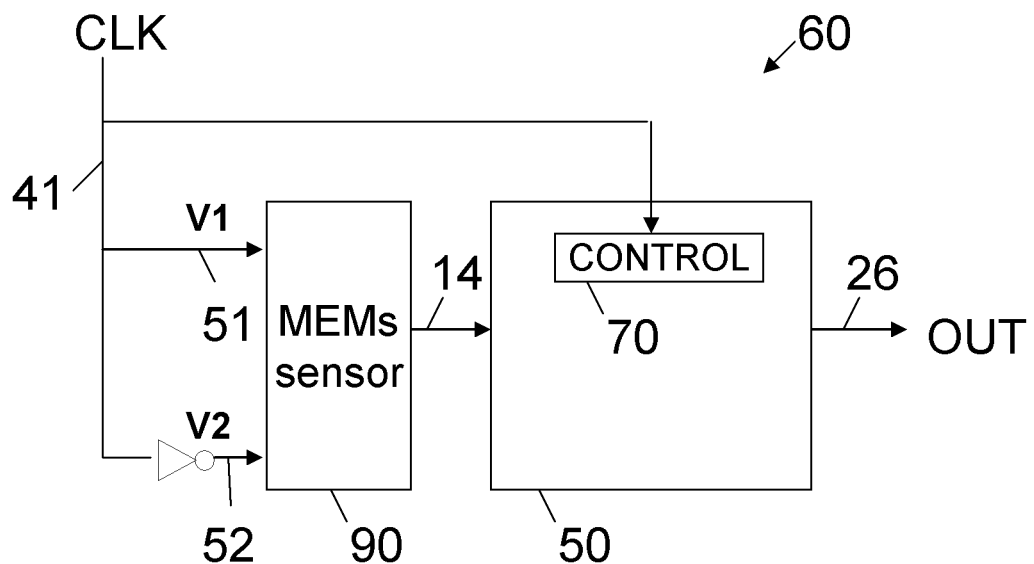
FIG. 2C shows a block diagram with a readout circuit according to one embodiment and a MEMS sensor, whereby the actuation voltages are generated externally of the readout circuit.
Figure 2D:
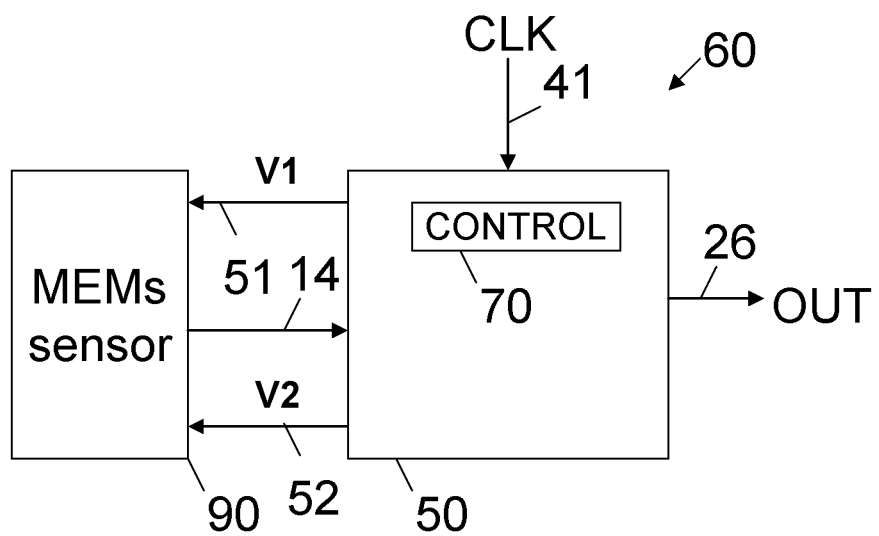
FIG. 2D shows a block diagram with a readout circuit according to one embodiment and a MEMS sensor, whereby the actuation voltages are supplied by the readout circuit.

It is clear from the above description and from FIG. 4B that the readout circuit 50 must be synchronized with the actuation voltages 51, 52, for the integration to work. In the example of FIG. 4B, the synchronization was chosen such that the reference switches 12, 13 (SW1, SW3) are open and the integrate switch 16 was closed at the rising edge of the first actuation voltage 51 (V1), while at the falling edge of the first actuation voltage 51 (V1) the reference switches 12, 13 (SW1, SW3) are closed and the integrate switch 16 is open. In another embodiment the second signal 17 corresponding to the falling edge of V1 is measured, while that corresponding to the rising edge is bypassed. The synchronization may be implemented in several ways, for example the block diagram of FIG. 2C shows how the actuation voltages 51, 52 (V1, V2) are derived from an external clock signal CLK, which clock signal CLK is also applied to the readout circuit 50. FIG. 2D shows another topology where the external clock signal CLK is applied to the readout circuit 50, and the actuation voltages 51, 52 (V1, V2) are generated by the readout circuit 50. Other configurations known to the person skilled in the art are however also possible. Instead of clock signals, the actuation voltages 51, 52 (V1, V2) may e.g. also be anti-phased sinusoidal signals, preferably with a DC-offset, so that both signals have the same polarity (i.e. are positive voltages), while their average (i.e. their sum divided by 2) is equal to the constant first reference voltage Vref1 at any moment in time.

In case the integrator capacitor 24 (Cf) is not a single capacitor but a capacitor array (as the Cf-array shown in FIG. 6A, but added to the circuit of FIG. 2A or FIG. 2B), whereby the value of Cf can be set by controlling by switches S1, S2, . . . SN, the gain of the circuit can also be set by modifying the value of the integrating capacitor Cf, besides the choice of the number N. A larger Cin or a smaller Cf increases the gain. This adds to the readout system 50 another option of setting the sensitivity and increase/decrease the range of accelerations/strain to be detected. Such a circuit has an even higher versatile and variable gain setting/dynamic range topology. In such a system the range of accelerations to be measured (e.g. 2 g, 4 g, 8 g etc) can vary either by varying the number N of pulses to be integrated, or the gain set by the bank of integrating capacitors Cf1, Cf2 . . . , CfN, or a combination of both.

The timing diagrams and flow-charts of FIGS. 3A-4B illustrate a method for measuring the capacitance value of the MEMS sensor 90 and for generating an output signal 26 (or 34) indicative of the measured capacitance value using the readout-circuit 50 described above, comprising:

receiving the first signal 14 from the MEMS sensor 90, the first signal 14 being indicative of the capacitance value in the input stage 10, and deriving from the first signal 14 a second signal 17;

receiving the second signal 17 in the charge amplifier stage 20, amplifying and integrating the second signal 17, and presenting the amplified and integrated second signal as the output signal 26;

controlling the operation of the readout circuit 50 by control logic 70 according to a predefined timing relation synchronized to a first and a second actuation voltage 51, 52 which are applied to the MEMS sensor 90 for generating the first signal 14 on an output of the MEMS sensor 90;

controlling the first and the second switching units 12, 16 according to the predefined timing relation such that a plurality of the second signals 17 are accumulated on the charge amplifier stage 20.

Figure 5A:
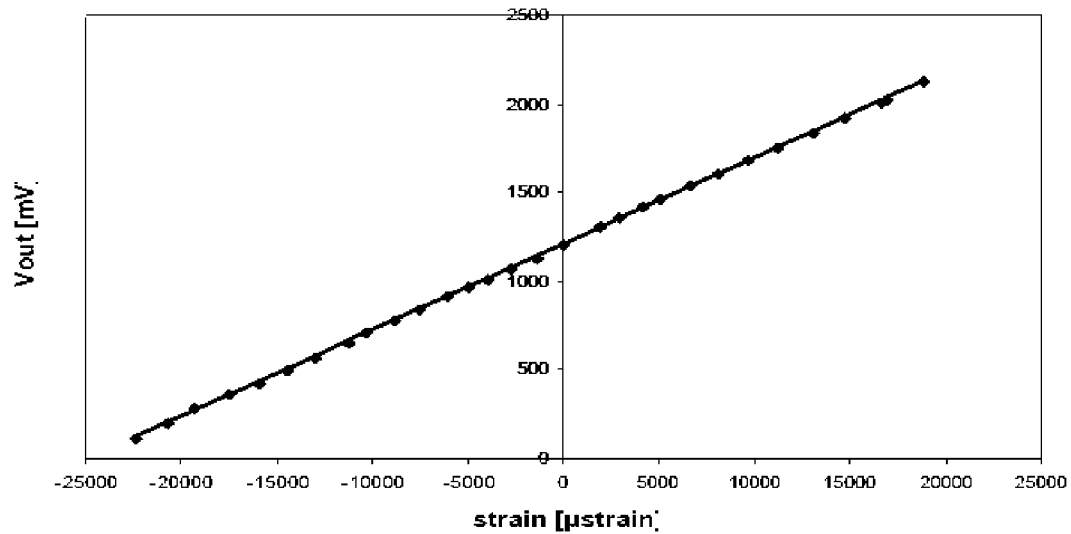
FIG. 5A shows an actual measurement of a strain sensor using an embodiment of the circuit according to one embodiment.

FIG. 5A shows the output voltage in function of input stress, using the second preferred embodiment of the readout circuit 50 according to one embodiment, when measuring a typical capacitive strain sensor whereby N was set to 24. The range of this measurement is +/−20000 μstrains. The resolution was approximately 10 μstrains, the accuracy is within +/−0.6%.

Figure 5B:
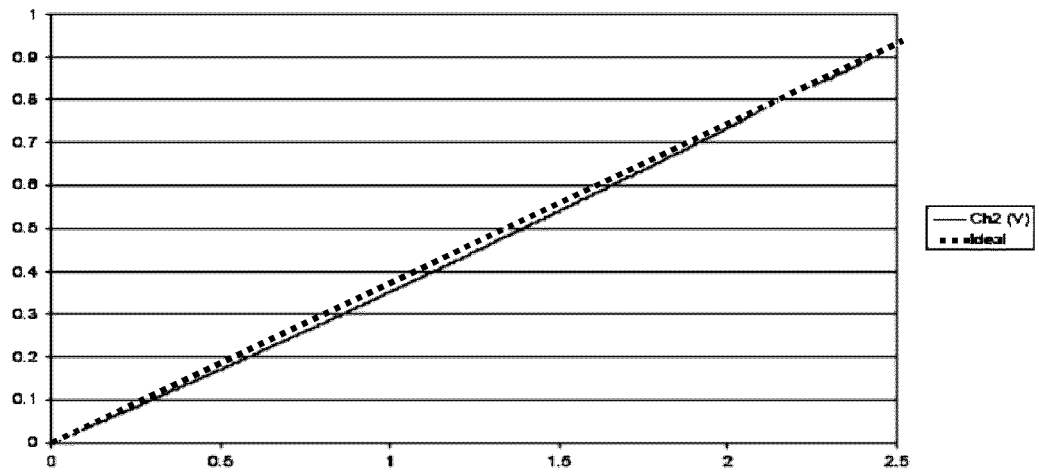
FIG. 5B shows an actual measurement of an accelerometer using an embodiment of the circuit according to one embodiment.

FIG. 5B shows the output voltage in function of acceleration measured by an embodiment of the readout circuit 50 according to one embodiment whereby N was set to 24, placed in a shaker vibrating at 20 Hz at +/−2.5 g. The accuracy is within +/−1.0%.

Figure 6A:
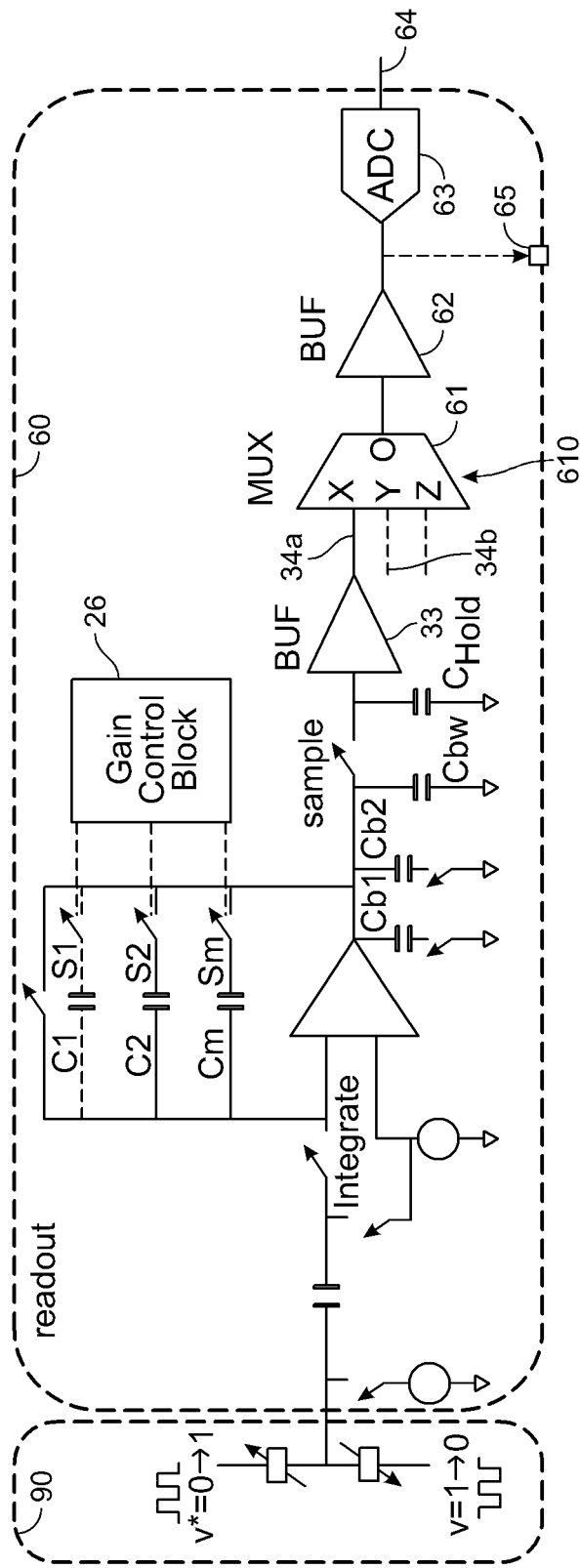
FIG. 6A shows a block diagram of a device according to one embodiment, comprising three readout circuits as described above, and a multiplexer, and an Analog-To-Digital converter.

FIG. 6A shows an embodiment of an electronic system 60, e.g. a device or an integrated circuit, comprising at least one electronic readout circuit 50 as described above. Preferably the electronic circuit 60 comprises a first and a second electronic readout circuit 50a, 50b as described above (only one of which is shown), and further comprising a multiplexer 61 (MUX) for alternately providing the output signals 34a, 34b of the first resp. second electronic readout circuit 50, for reading a first resp. a second capacitive MEMS sensor, e.g. three MEMS sensors, only one of which is shown in FIG. 6A for clarity reasons. Preferably the sensor(s) 90 are embedded in the system 60, e.g. integrated on the same chip. The circuit shown in FIG. 6A can for example be used for building a three-dimensional accelerometer by measuring three sensors oriented in three directions, e.g. the X, Y, Z direction.

The electronic system 60 may further comprise an Analog-To-Digital converter 63 (ADC). Note that the ADC can be omitted when the device outputs the measured capacitances as analogue values 34. Note that the buffered and sampled output is directly suited for ADC conversion without need of extra anti aliasing filter.

One specific advantageous form of implementation for the charge integration amplifier 23 in any of the Figures uses an operational transconductance amplifier OTA to achieve high linearity whereby the bandwidth capacitor 22 (Cbw) in combination with the transconductance of the amplifier OTA define the bandwidth for minimal aliasing of noise after sampling, for achieving a high signal to noise ratio SNR. Alternatively an operation amplifier (op amp) might also be used. The value of the bandwidth can also be modified by a bank (also called array) of capacitors (Cb1, Cb2) and corresponding switches located at the output of the charge amplifier 23 as shown in FIG. 6A.

The voltage which appears at the output of the charge amplifier 23 is then sampled and hold for a period of time, depending on the number of channels X, Y, Z being sampled. Thanks to the sample & hold circuitry 30, the measured values for e.g. the X and Y channel can then be read out during the measurement of the Z channel. The output signal 26 is passed to a first buffer 33 which provides the signal to an analog multiplexer 61 (MUX). Next a second output buffer 62 is added to drive a desired output, for example an A/D converter 63 (ADC). The already sampled signal 26 relaxes the requirements of the A/D converter and therefore contributes to lower power consumption in a system requiring the A/D conversion.

Figure 6B:
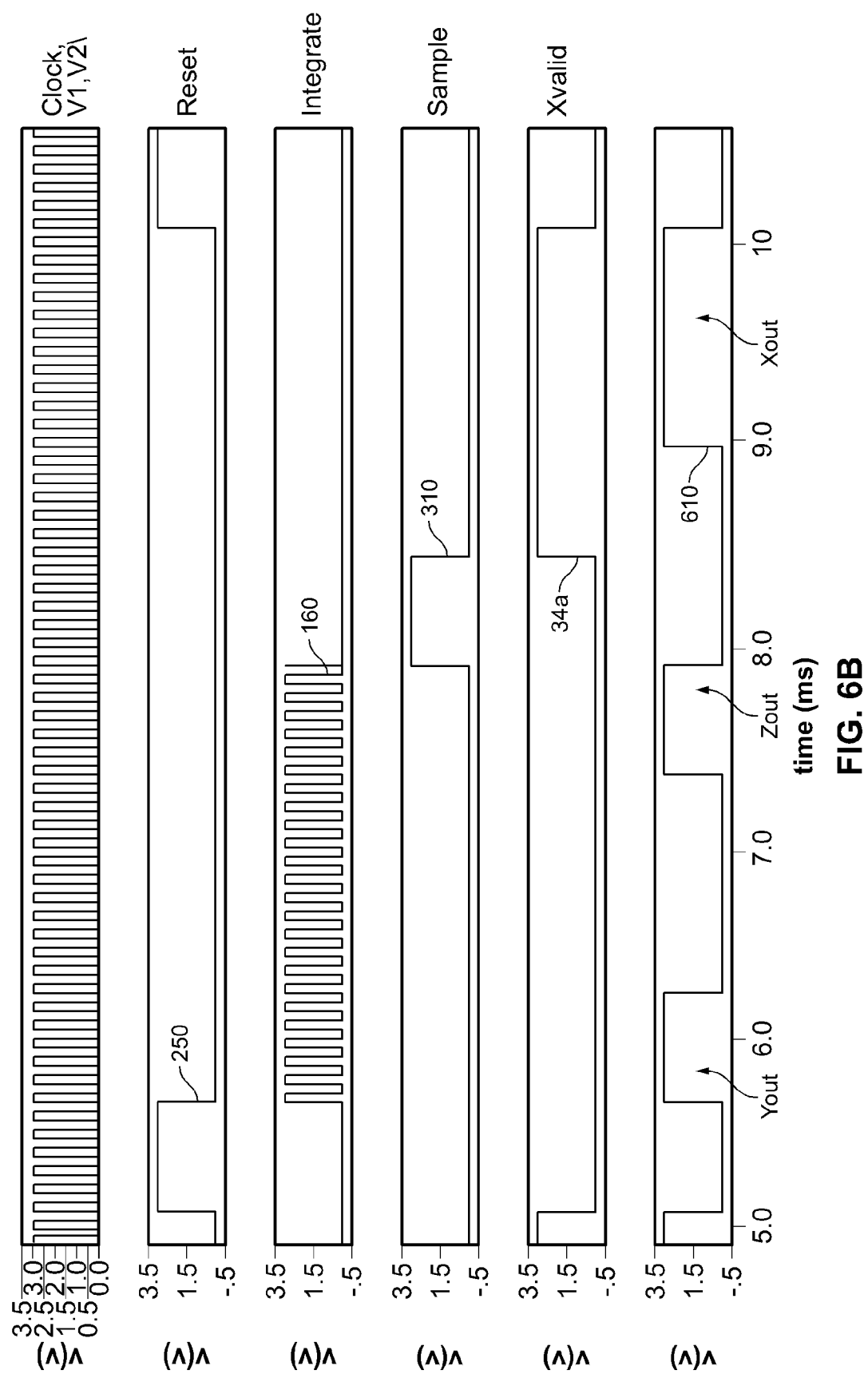
FIG. 6B gives an example of a timing diagram of the control signals which may be used in the circuit of FIG. 6A.

FIG. 6B gives an example of a timing diagram of the control signals which may be used in the circuit of FIG. 6A. The three readout circuits 50 (only one of which is shown) work synchronous to each other, and use the same number of integration pulses (e.g. 24 in the example shown), but the disclosure is not limited thereto, and also more complicated timing schemes may be used, e.g. a circuit wherein the Z direction is measured at twice the frequency of the X and Y directions. The first four plots (CLK, Reset, Integrate and Sample are the same as described above for a one-channel readout-circuit. The fifth plot shows when the measured data 34 (Xvalid) is present at the output of the sample and hold buffer 33. The sixth plot indicates the mux control signal 610 for selecting one of the three output values 34a, 34b, 34c. If this value is presented as an analog voltage signal on an output pin 65 of the device 60, it is preferably buffered by an additional buffer 62 placed behind the multiplexer 61. Preferably the multiplexed value is converted to a digital value 64 using an (internal or external) ADC 63, which digital value 64 may e.g. be stored and read from a serial or parallel register (not shown) using known techniques.

Figure 7:
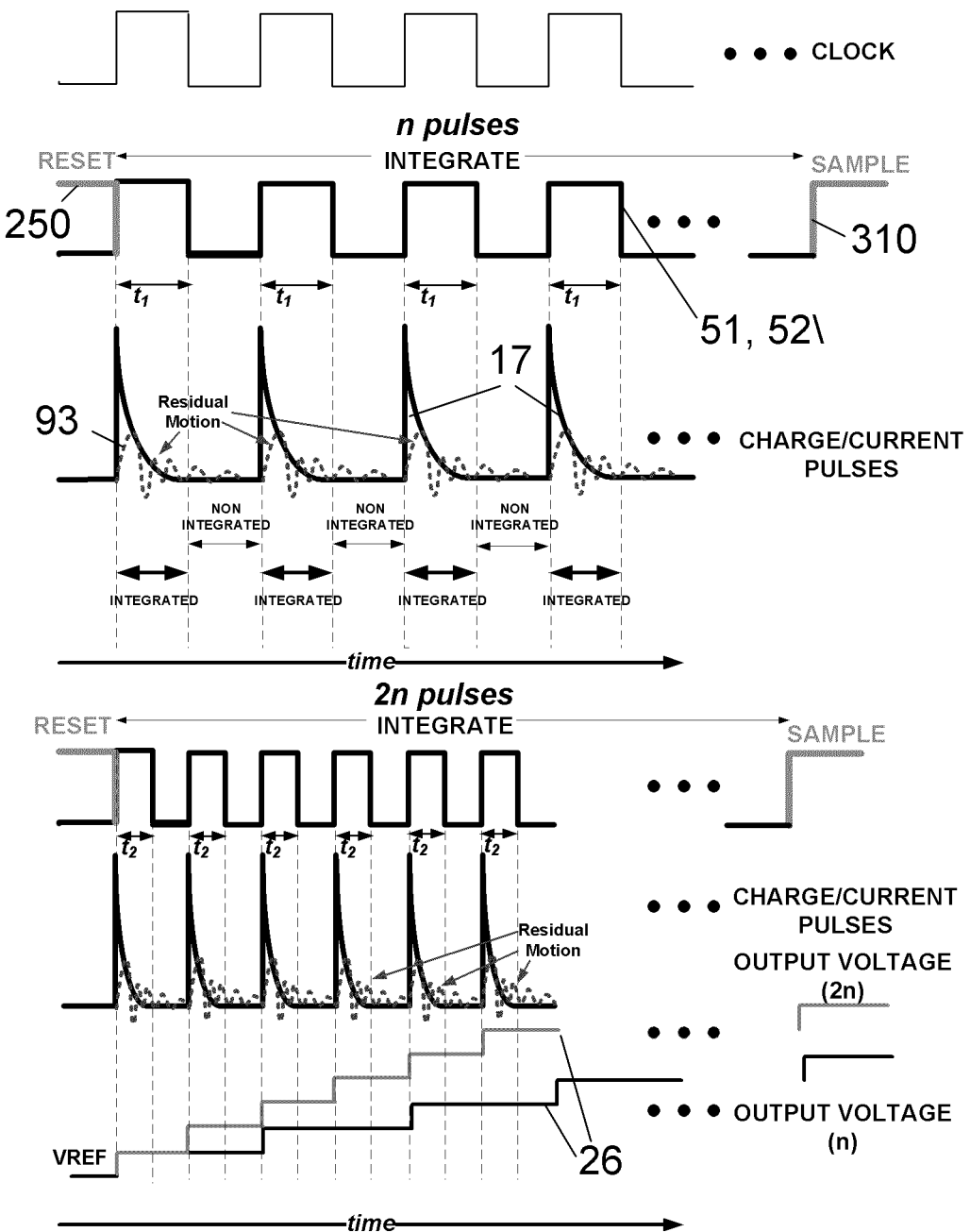
FIG. 7 is a graph showing how residual motion of the MEMS sensor is reduced by increasing the number of integration pulses.
Figure 8A:
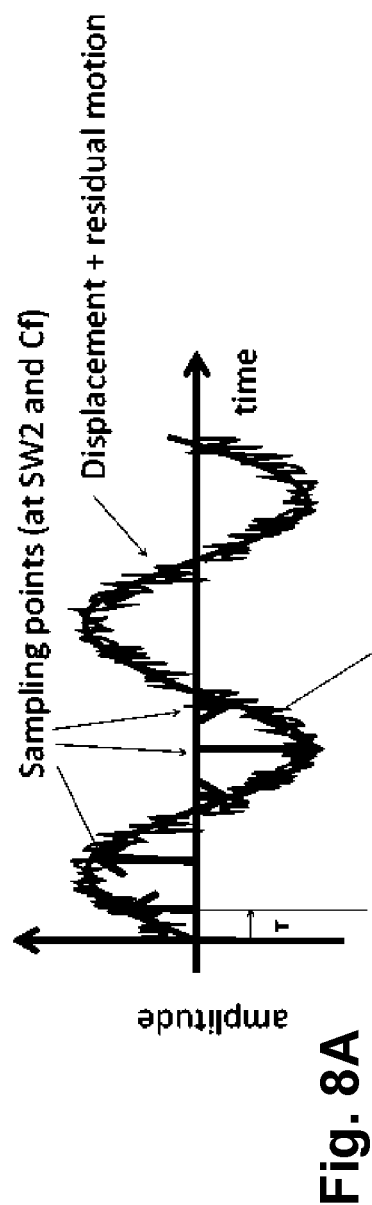
FIG. 8A shows an example of the sampling of a sine-wave acceleration with superimposed residual motion.
Figure 8B:
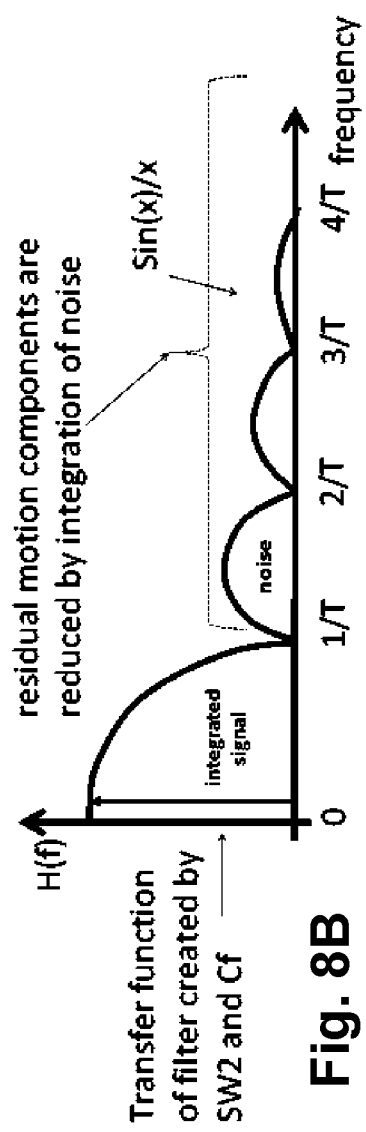
FIG. 8B shows how the sin(x)/x transfer of the integrate switch reduces the residual motion.

The inventor has found that the residual motion of the sensor 90 during the measurement of the capacitance value of the sensor 90 using the readout circuit 50 according to one embodiment is reduced. Referring to FIG. 7, the proposed architecture suppresses the residual motion effect in a unique way. The sample and hold (by switch 31) combined with the number N of integrated pulses allows the architecture to reduce the effects of residual motion due to the accurate sin(x)/x response of the proposed architecture. The sin(x)/x comes from the on-time of the integrate switch 16 (SW2) in combination with capacitor Cf, as illustrated in FIGS. 8A and 8B. The residual motion of the sensor is attenuated as the number N of integrated pulses increases, as illustrated in FIG. 7. The residual motion is also attenuated by increasing the duty-cycle of the actuator voltages 51, 52 (V1, V2).

Having explained the circuit of FIG. 2B in full detail, it is clear for the person skilled in the art how the circuit of FIG. 2A works, because it can be seen as a subset of the circuit of FIG. 2B, which does not have the input capacitor 15 (Cin) and related pre-charging means, but all the rest is similar or identical, except for some minor changes, such as the bias voltage for the amplifier, which is Vref1 in FIG. 2A but Vref2 in FIG. 2B, but is clear from FIG. 2A what is meant. Also the table of FIG. 4B can be used for the circuit of FIG. 2A, by leaving out the column for the second reference switch 13 (SW3).

As mentioned before, the amplitude of the actuator voltages may be smaller than that of the clock signal, e.g. 1.0 Volt. This may e.g. be achieved by using a resistive divider or a capacitive divider, or a DC-DC converter, or in any other way known to the person skilled in the art.

One embodiment relates to a readout circuit 50 for measuring capacitive MEMS devices 90, with a highly flexible configuration which allows it to be used in a large range of MEMS devices (e.g. acceleration MEMS sensors ranging from 2 g to 10 g). It has a variable gain, which can be set by choosing a specific number "N" of integration pulses. In an embodiment the gain can additionally be set by means of a switched capacitor array Cf. In an embodiment it additionally has provisions for allowing the bias voltage of the amplifier 23 to be DC-decoupled from the sensor 90, thereby allowing an even larger range of capacitive sensors 90 to be measured. It has provisions for allowing the actuator voltages 51, 52 (V1, V2) to be of the same polarity, thereby reducing overall power consumption of a system comprising the readout circuit 50.

Figure 9:
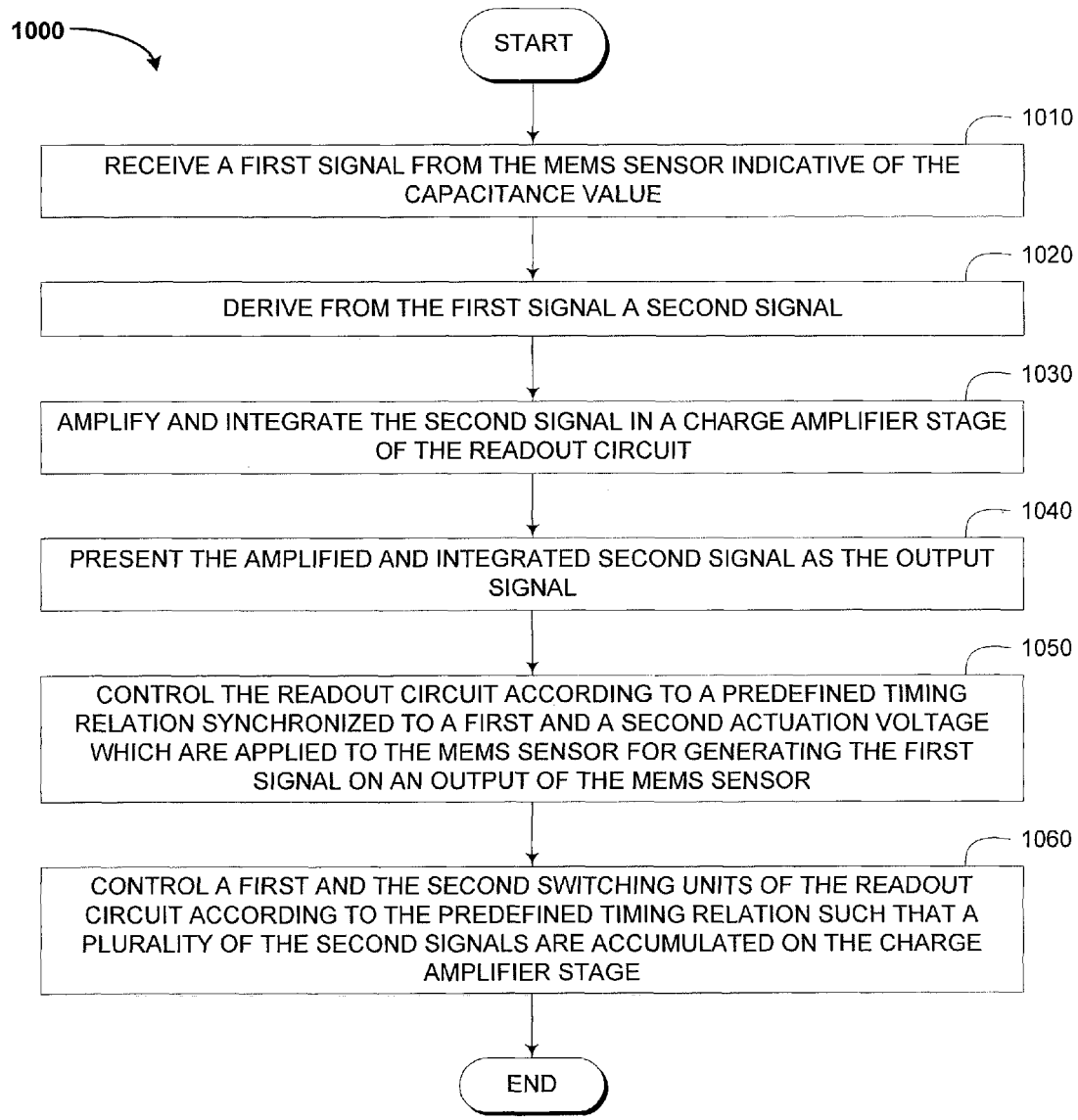
FIG. 9 shows a flowchart of one embodiment of a method of measuring the capacitance value of a MEMS sensor and for generating an output signal indicative of the measured capacitance value using a readout-circuit.

FIG. 9 shows a flowchart of one embodiment of a method of measuring the capacitance value of a MEMS sensor and for generating an output signal indicative of the measured capacitance value using a readout-circuit. The method 1000 includes receiving a first signal from the MEMS sensor indicative of the capacitance value in block 1010. Next at a block 1020, the method includes deriving from the first signal a second signal. Moving to block 1030, the method includes amplifying and integrating the second signal in a charge amplifier stage of the readout circuit. At block 1040, the method includes presenting the amplified and integrated second signal as the output signal.

Moving to block 1050, the method includes controlling the readout circuit according to a predefined timing relation synchronized to a first and a second actuation voltage which are applied to the MEMS sensor for generating the first signal on an output of the MEMS sensor. Next at block 1060, the method includes controlling a first and the second switching units of the readout circuit according to the predefined timing relation such that a plurality of the second signals are integrated on the charge amplifier stage.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

Each of the references as listed below is incorporated herein in its entirety by reference.

REFERENCES

[1] Wung, A. et al, 'Tri-Axial High-G CMOS-MEMS Capacitive Accelerometer Array', IEEE 21st International Conference on Micro Electro Mechanical Systems, 2008, pp: 876-879.
[2] Yazdi, N et al, 'Precision Readout Circuits for Capacitive Microaccelerometes', Proceedings of IEEE Sensors, 2004, Vol. 1, pp: 28-31
[3] Steadman. R et al, 'A CMOS Photodiode Array With In-Pixel Data Acquisition System for Computed Tomography', IEEE Journal of Solid-State Circuits, Vol. 39, No. 7, 2004, pp: 1034-1043
[4] Capacitively Readout Multi-element Sensor Array with Common-Mode Cancellation, U.S. Pat. No. 6,167,748 B1, Jan. 2, 2001.
[5] Weng. M et al, "A High-Speed Low-Noise CMOS 16-Channel Charge Sensitive Preamplifier ASIC for APD-Based PET Detectors", IEEE Transactions on Nuclear Science, Vol. 50, No. 4, 2003, pp. 898-902.
[6] Linear Programmable Switch-Capacitance Gain Amplifier, United States Patent US 2008/0297243 A1, Dec. 4, 2008.
[7] Dual-Chopper Amplifier and its Usage as Readout Circuit for Capacitive Sensors, United States Patent US 2008/01918000 A1, Aug. 14, 2008.
[8] ADXL330 3-Axis ±3 g iMEMS Accelerometer DataSheet, Analog Devices, 2007
[9] Suster, M et al, 'A High-Performance MEMS Capacitive Strain Sensing System', Journal of Microelectromechanical Systems, Vol. 15, No. 5, October 2006, pp; 1069-1077.

What is claimed is:

1. An electronic readout-circuit for measuring a capacitance value of a microelectromechanical systems (MEMS) sensor and for generating an output signal indicative of the measured capacitance value, the readout-circuit comprising:
    an input stage having an input port configured to receive a first signal from the MEMS sensor, the first signal being indicative of the capacitance value, and an output port configured to produce a second signal derived from the first signal;
    a charge amplifier stage configured to receive the second signal from the output port of the input stage, the charge amplifier stage having components for amplifying and integrating the second signal, and an output configured to send the amplified and integrated second signal as the output signal;
    a control logic configured to control the operation of the readout-circuit according to a predefined timing relation synchronized to a first and a second actuation voltage, the first and second actuation voltages being applied to the MEMS sensor for generating the first signal on an output of the MEMS sensor;
    a first switching unit connected between the input port of the input stage and a first reference voltage source and configured to apply a first reference voltage to the MEMS sensor;
    a second switching unit connected between the input port and the output port of the input stage and configured to apply the second signal to a first input of the charge amplifier stage, wherein the first and the second switching units are connected to the control logic for being controlled according to the predefined timing relation such that a plurality of the second signals are accumulated on the charge amplifier stage;
    an input capacitor connected between the MEMS sensor and the second switching unit and configured to capacitively couple the output of the MEMS sensor to the first input of the charge amplifier stage while creating a DC-offset between the sensor and the charge amplifier stage;
    a second reference voltage source connected to a second input of the charge amplifier stage; and
    a third switching unit connected between the input capacitor and the second reference voltage source and configured to pre-charge the input capacitor for creating the DC-offset.

2. The electronic readout-circuit according to claim 1, wherein the first reference voltage source is also connected to a second input of the charge amplifier stage.

3. The electronic readout-circuit according to claim 1, wherein the first reference voltage is a voltage between ground and the second reference voltage.

4. The electronic readout-circuit according to claim 1, wherein the first and the second actuation voltages have the same polarity.

5. The electronic readout-circuit according to claim 1, wherein the first actuation voltage comprises a first clock signal, and the second actuation voltage comprises a second clock signal having a same frequency as the first clock signal, except being approximately 180° phase shifted.

6. The electronic readout-circuit according to claim 1, wherein the first reference voltage is a DC voltage with an amplitude of about 30% to 70% of an amplitude of the first actuation voltage.

7. The electronic readout-circuit according to claim 1, wherein the first reference voltage is a DC voltage with an amplitude of about 40-60% of an amplitude of the first actuation voltage.

8. The electronic readout-circuit according to claim 1, wherein the first reference voltage is a DC voltage with an amplitude of about 50% of an amplitude of the first actuation voltage.

9. The electronic readout-circuit according to claim 1, wherein the charge amplifier stage comprises:
    an amplifier having a first input connected to the first input of the charge amplifier stage and being configured to receive the second signal, and a second input connected to the second input of the charge amplifier stage and configured to receive a reference voltage, and an amplifier output connected to the output of the charge amplifier stage and configured to provide the output signal;

an integrator capacitor connected between the first input of the amplifier and the amplifier output for integrating the second signal;

a reset switch configured to discharge the integrator capacitor; and a band-limiting capacitor connected between the amplifier output and a reference voltage (GND) and configured to increase the stability of the readout-circuit.

10. The electronic readout-circuit according to claim 7, wherein the integrator capacitor comprises a switched capacitor array configured to provide gain control of the readout-circuit.

11. The electronic readout-circuit according to claim 1, further comprising a sample-and-hold stage connected to the output of the charge amplifier stage, the sample-and-hold stage having components for sampling and holding the output signal and for providing the sampled output signal as the output signal.

12. The electronic readout-circuit according to claim 11, further comprising the MEMS sensor.

13. The electronic readout-circuit according to claim 1, further comprising an analog-to-digital convertor configured to digitize the output signal.

14. An electronic device comprising the electronic readout-circuit according to claim 1.

15. An electronic device comprising a first and a second electronic readout-circuit according to claim 1, the device further comprising a multiplexer configured to alternately provide the output signal of the first and second electronic readout-circuit.

16. A method of measuring the capacitance value of a microelectromechanical systems (MEMS) sensor and for generating an output signal indicative of the measured capacitance value using a readout-circuit, the method comprising:

receiving a first signal from the MEMS sensor indicative of the capacitance value;

deriving from the first signal a second signal;

amplifying and integrating the second signal in a charge amplifier stage of the readout-circuit;

presenting the amplified and integrated second signal as the output signal;

controlling the readout-circuit according to a predefined timing relation synchronized to a first and a second actuation voltage which are applied to the MEMS sensor for generating the first signal on an output of the MEMS sensor;

controlling a first switching unit and a second switching unit of the readout-circuit according to the predefined timing relation such that a plurality of the second signals are integrated on the charge amplifier stage;

capacitively coupling the output of the MEMS sensor to a first input of the charge amplifier stage while creating a DC-offset between the MEMS sensor and the charge amplifier stage; and pre-charging an input capacitor connected between the MEMS sensor and the second switching unit to create the DC-offset.

17. The method according to claim 16, wherein the first and the second actuation voltages have the same polarity.

18. The method according to claim 16, wherein the first actuation voltage comprises a first clock signal, and the second actuation voltage comprises a second clock signal having a same frequency as the first clock signal, except being approximately 180° phase shifted.

19. A system for measuring the capacitance value of a microelectromechanical systems (MEMS) sensor and for generating an output signal indicative of the measured capacitance value using a readout-circuit, the system comprising:

means for receiving a first signal from the MEMS sensor indicative of the capacitance value;

means for deriving from the first signal a second signal;

means for amplifying and integrating the second signal in a charge amplifier stage of the readout-circuit;

means for presenting the amplified and integrated second signal as the output signal;

means for controlling the readout-circuit according to a predefined timing relation synchronized to a first and a second actuation voltage which are applied to the MEMS sensor for generating the first signal on an output of the MEMS sensor;

means for controlling a first and the second switching units of the readout-circuit according to the predefined timing relation such that a plurality of the second signals are integrated on the charge amplifier stage;

means for capacitively coupling the output of the MEMS sensor to a first input of the charge amplifier stage while creating a DC-offset between the MEMS sensor and the charge amplifier stage; and means for pre-charging the capacitively coupling means to create the DC-offset.

* * * * *